United States Patent
Hitomi et al.

(10) Patent No.: US 11,293,395 B2
(45) Date of Patent: Apr. 5, 2022

(54) CONTROL DEVICE FOR ENGINE

(71) Applicant: Mazda Motor Corporation, Hiroshima (JP)

(72) Inventors: Mitsuo Hitomi, Aki-gun (JP); Eiji Nakai, Aki-gun (JP); Naohiro Yamaguchi, Aki-gun (JP); Hiroki Morimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/263,432

(22) PCT Filed: Jul. 9, 2019

(86) PCT No.: PCT/JP2019/027181
§ 371 (c)(1),
(2) Date: Jan. 26, 2021

(87) PCT Pub. No.: WO2020/026721
PCT Pub. Date: Feb. 6, 2020

(65) Prior Publication Data
US 2021/0310456 A1    Oct. 7, 2021

(30) Foreign Application Priority Data

Aug. 2, 2018 (JP) .............................. JP2018-145626
Aug. 2, 2018 (JP) .............................. JP2018-145627

(51) Int. Cl.
*F02P 5/152* (2006.01)
*F02D 15/00* (2006.01)
(Continued)

(52) U.S. Cl.
CPC .............. *F02P 5/152* (2013.01); *F02D 15/00* (2013.01); *F02D 35/023* (2013.01);
(Continued)

(58) Field of Classification Search
CPC ...... F02P 5/152; F02D 15/00; F02D 41/1401; F02D 41/38; F02D 35/023; F02D 2250/18; F02D 2041/1412; F02D 35/027
(Continued)

(56) References Cited

U.S. PATENT DOCUMENTS

| 4,367,531 A | * | 1/1983 | Furuhashi | F02P 5/152 |
| | | | | 701/111 |
| 4,774,922 A | * | 10/1988 | Morita | F02P 5/1523 |
| | | | | 123/406.29 |

(Continued)

FOREIGN PATENT DOCUMENTS

DE   102016208980 A1   11/2017
JP   2002339848 A   *   11/2002
(Continued)

OTHER PUBLICATIONS

Japan Patent Office, Office Action Issued in Application No. 2018145626, dated Dec. 21, 2020, 9 pages.
(Continued)

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

In an engine having fuel supply means for supplying fuel containing gasoline to a combustion chamber and ignition means for igniting an air-fuel mixture, if knocking occurs when ignition is performed at a reference ignition timing set on a retarded side of MBT that is an ignition timing at which the engine torque is maximized in a high-load region in which the engine load is larger than a predetermined load, ignition advance control that causes the ignition means to perform ignition at a timing on an advanced side of the reference ignition timing is performed.

12 Claims, 10 Drawing Sheets

(51) Int. Cl.
*F02D 35/02* (2006.01)
*F02D 41/14* (2006.01)
*F02D 41/38* (2006.01)

(52) U.S. Cl.
CPC ......... *F02D 41/1401* (2013.01); *F02D 41/38* (2013.01); *F02D 2041/1412* (2013.01); *F02D 2250/18* (2013.01)

(58) Field of Classification Search
USPC .................. 701/111; 123/406.21, 406.29
See application file for complete search history.

(56) References Cited

U.S. PATENT DOCUMENTS

| | | | | |
|---|---|---|---|---|
| 4,860,711 | A * | 8/1989 | Morikawa | F02D 15/04 123/48 D |
| 4,993,388 | A * | 2/1991 | Mitsumoto | F02P 5/1527 123/406.42 |
| 6,293,246 | B1 * | 9/2001 | Tanahashi | F02D 35/023 123/305 |
| 6,354,264 | B1 * | 3/2002 | Iwakiri | F02D 41/1497 123/305 |
| 6,553,949 | B1 * | 4/2003 | Kolmanovsky | F02B 75/045 123/48 B |
| 7,370,634 | B2 * | 5/2008 | Christman | F02P 5/152 123/406.29 |
| 8,000,884 | B2 * | 8/2011 | Aso | G01L 23/225 701/111 |
| 8,800,532 | B2 * | 8/2014 | Garagnani | F02D 13/0219 123/406.29 |
| 2006/0207555 | A1 * | 9/2006 | Ito | F02M 63/029 123/406.47 |
| 2007/0215096 | A1 * | 9/2007 | Kumano | F02P 17/12 123/295 |
| 2008/0066713 | A1 * | 3/2008 | Megli | F02D 41/307 123/295 |
| 2008/0087255 | A1 * | 4/2008 | Aoyama | F02D 15/02 123/48 B |
| 2008/0289603 | A1 | 11/2008 | Konakawa | |
| 2009/0165746 | A1 * | 7/2009 | Aso | G01L 23/225 123/406.38 |
| 2010/0037859 | A1 * | 2/2010 | Mashiki | F02D 41/062 123/406.33 |
| 2011/0220058 | A1 * | 9/2011 | Cleeves | F02D 15/00 123/295 |
| 2012/0222653 | A1 * | 9/2012 | Kodama | F02P 5/152 123/406.11 |
| 2014/0076280 | A1 * | 3/2014 | Kondo | F02P 5/1502 123/406.55 |
| 2015/0377115 | A1 * | 12/2015 | Shinagawa | F02D 41/221 123/41.15 |
| 2017/0058817 | A1 * | 3/2017 | Tsumura | F02B 11/02 |
| 2018/0112606 | A1 * | 4/2018 | Huang | F02D 35/027 |
| 2019/0309699 | A1 | 10/2019 | Inoue et al. | |
| 2019/0316535 | A1 * | 10/2019 | Imai | F02D 41/40 |
| 2019/0331082 | A1 * | 10/2019 | Ota | B60W 20/00 |

FOREIGN PATENT DOCUMENTS

| | | |
|---|---|---|
| JP | 2002339848 A | 11/2002 |
| JP | 2003049691 A | 2/2003 |
| JP | 2004176688 A | 6/2004 |
| JP | 2008291758 A | 12/2008 |
| JP | 2013113176 A | 6/2013 |
| JP | 2018084175 A | 5/2018 |
| WO | 2005073548 A1 | 8/2005 |

OTHER PUBLICATIONS

Japan Patent Office, Office Action Issued in Application No. 2018-145627, dated Aug. 6, 2020, 6 pages.

* cited by examiner

CONTROL DEVICE FOR ENGINE

TECHNICAL FIELD

The present invention relates to a control device for an engine having a cylinder in which a combustion chamber is formed.

BACKGROUND ART

Conventionally, in the field of an engine, various measures for preventing occurrence of knocking have been taken. Specifically, under conditions where engine loads are high and the temperature in the combustion chamber is high, self-ignition combustion of an air-fuel mixture of fuel and air occurs in the outer periphery of the combustion chamber and the like separately from main combustion, and high pressure waves are generated, thereby causing knocking, that is, vibrations of the cylinders and pistons. Since occurrence of knocking may increase noise and damage the pistons and the like, knocking needs to be prevented.

For example, Patent Literature 1 discloses an engine that retards the ignition timing when knocking occurs.

When the ignition timing is simply retarded to avoid knocking as in the engine in Patent Literature 1, under operating conditions where the basic ignition timing is set on the retarded side of the MBT that is the ignition timing at which the engine torque is maximized, the engine torque is reduced because the ignition timing is retarded. Particularly when the compression ratio of the cylinder is high, the engine torque may be significantly reduced. Specifically, when the compression ratio is high, knocking is likely to occur and combustion occurs steeply, thereby causing increase in combustion noise and the amount of NOx production. Accordingly, when the compression ratio of the cylinder is high, the basic ignition timing (basic ignition timing according to the operating range of and the operating environment state of the engine) is set to a timing considerably retarded from the MBT and the combustion tends to start after the compression top dead center. On the other hand, the amount of change in the piston position with respect to the change in the crank angle at the beginning of the expansion stroke when the compression ratio is high is larger than the amount of change when the compression ratio is low. Accordingly, when the compression ratio is high, even if the ignition timing is retarded by a small amount from the basic ignition timing, the piston position during combustion becomes significantly lower (the amount of separation from the position at the compression top dead center becomes significantly larger), thereby significantly reducing the engine torque and furthermore the fuel efficiency performance.

CITATION LIST

Patent Literature

Patent Literature 1: JP-A-2008-291758

SUMMARY OF INVENTION

An object of the present invention is to provide a control device for an engine that can suppress knocking while ensuring high fuel efficiency performance.

An control device for an engine according to an aspect of the present invention is a control device for an engine having a cylinder in which a combustion chamber is formed, the device including fuel supply means for supplying fuel containing gasoline to the combustion chamber; ignition means for igniting an air-fuel mixture of air and the fuel supplied to the combustion chamber by the fuel supply means; and control means for controlling the ignition means, in which, if knocking occurs when ignition is performed at a reference ignition timing set on a retarded side of the MBT that is an ignition timing at which an engine torque is maximized in a high-load region in which an engine load is larger than a predetermined load, the control means performs ignition advance control that causes the ignition means to perform ignition at a timing on an advanced side of the reference ignition timing.

DESCRIPTION OF EMBODIMENTS

Embodiments of the present invention will be described with reference to the accompanying drawings. The following embodiments are examples in which the present invention is embodied and do not limit the technical scope of the present invention.

(1) Overall Structure of Engine

Figure 1:
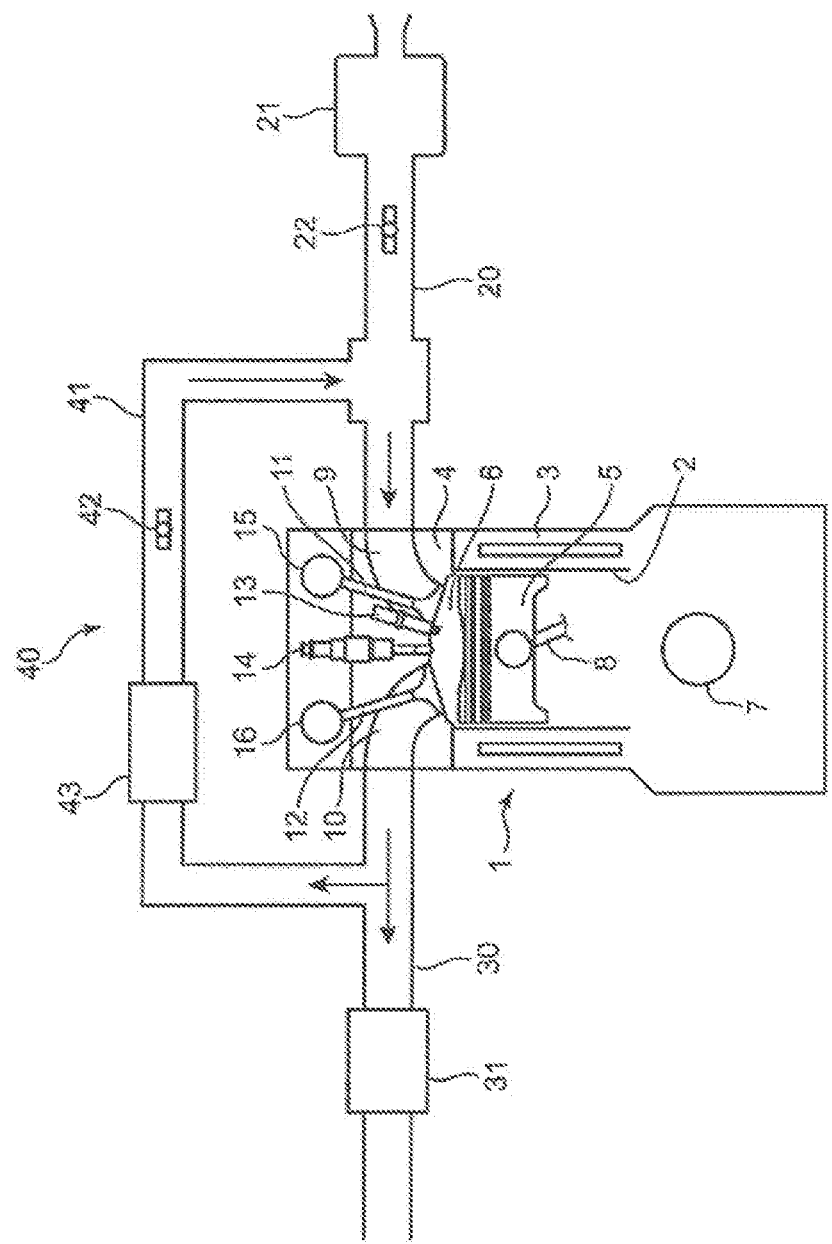
FIG. 1 is a diagram illustrating the structure of an engine system according to an embodiment of the present invention.

FIG. 1 is a diagram illustrating the structure of an engine system to which a control device for an engine according to the present invention is applied.

The engine system according to the first embodiment includes a four-stroke engine body 1, an intake passage 20 through which air for combustion is introduced to the engine body 1, and an exhaust passage 30 through which exhaust gas generated by the engine body 1 is exhausted.

The engine body 1 is, for example, an in-line four-cylinder engine in which four cylinders 2 are disposed in series in a direction orthogonal to the sheet in the FIG. 1. This engine system is installed in a vehicle and the engine body 1 is used as the drive source of the vehicle. In the first embodiment, the engine body 1 is driven by receiving the supply of fuel containing gasoline. It should be noted here that the fuel may be gasoline containing bioethanol or the like.

The engine body 1 includes a cylinder block 3 in which the cylinders 2 are formed, a cylinder head 4 provided on the upper surface of the cylinder block 3, and pistons 5 fitted into the cylinders 2 so as to be reciprocally (upward and downward) movable.

A combustion chamber 6 is formed above the piston 5. The combustion chamber 6 is of so-called pent roof type. The ceiling surface of the combustion chamber 6 configured by the lower surface of the cylinder head 4 is shaped like a triangular roof formed by two inclined surfaces on the intake side and the exhaust side. The top surface of the piston 5 has a cavity formed by denting a region including the center of the top surface oppositely (downward) to the cylinder head 4. It should be noted here that the space between the top surface of the piston 5 and the ceiling surface of the combustion chamber 6 of the inner space of the cylinder 2 is referred to as a combustion chamber 6 regardless of the position of the piston 5 and the combustion state of an air-fuel mixture.

The geometric compression ratio of the engine body 1, that is, the ratio of the volume of the combustion chamber 6 when the piston 5 is located at the bottom dead center to the volume of the combustion chamber 6 when the piston 5 is located at the top dead center is set to a value (for example, approximately 20) between 15 and 30, inclusive.

The cylinder head 4 has an intake port 9 through which the air supplied from the intake passage 20 is introduced to the cylinder 2 (combustion chamber 6) and an exhaust port 10 through which the exhaust gas generated in the cylinder 2 is introduced to the exhaust passage 30. Two intake ports 9 and two exhaust ports 10 are formed for each of the cylinders 2.

The cylinder head 4 is provided with intake valves 11 that open and close the openings of the intake ports 9 close to the cylinder 2 and exhaust valves 12 that open and close the openings of the exhaust ports 10 close to the cylinder 2.

The intake valves 11 and the exhaust valves 12 are opened or closed in conjunction with the rotation of the crankshaft 7 by a valve mechanism including a pair of cam shafts provided in the cylinder head 4 and the like. The valve mechanism for the intake valves 11 includes an intake valve variable mechanism 11a (see FIG. 2) that can change the opening and closing timings of the intake valve 11. The intake valve variable mechanism 11a changes the opening timing and closing timings of the intake valve 11 according to the operating condition. When the opening and closing timings of the intake valve 11 are changed, the effective compression ratio of the cylinder 2 changes. As described above, in the first embodiment, the intake valve variable mechanism 11a functions as the effective compression ratio changing means for changing the effective compression ratio of the cylinder 2.

The cylinder head 4 is provided with an injector (fuel supply means) 14 for injecting fuel. The injector 14 has a tip portion in which an injection port is formed. The injector 14 is attached to the cylinder head 4 so that this tip portion is located near the center of the ceiling surface of the combustion chamber 6 and faces the center of the combustion chamber 6. The injector 14 has a plurality of injection openings at the tip thereof. The injector 14 injects fuel like a cone shape (specifically, a hollow cone shape) about the center axis of the cylinder 2 toward the top surface of the piston 5 from the vicinity of the center of the ceiling surface of the combustion chamber 6. The taper angle (spray angle) of the cone is, for example, 90° to 100°. The specific structure of the injector 14 is not limited to this and may have a single injection opening.

The injector 14 injects, into the combustion chamber 6, the fuel pumped from a high pressure pump (not illustrated). Since the injection pressure of the injector 14 is set to 20 MPa or more, the injector 14 injects fuel at a high pressure. For example, this injection pressure is set to approximately 25 MPa.

The cylinder head 4 is provided with a spark plug 13 for igniting an air-fuel mixture in the combustion chamber 6. Electrodes are formed at the tip of the spark plug 13 to give ignition energy to an air-fuel mixture by igniting the air-fuel mixture via spark discharge to. The spark plug 13 is disposed so that the tip thereof is located near the center of the ceiling surface of the combustion chamber 6 and faces the center of the combustion chamber 6.

The intake passage 20 is provided with, in order from the upstream side, an air cleaner 21 and a throttle valve 22 for opening and closing the intake passage 20. In the first embodiment, while the engine operates, the throttle valve 22 is basically fully opened or maintained at an opening close to this. Only under limited operating conditions, such as when the engine stops, the throttle valve 22 is closed to block the intake passage 20.

The exhaust passage 30 is provided with a purifying device 31 for purifying exhaust. The purifying device 31 includes, for example, a three-way catalyst.

The exhaust passage 30 is provided with an EGR device 40 for causing a part of exhaust gas passing through the exhaust passage 30 to flow back to the intake passage 20 as EGR gas. The EGR device 40 has an EGR passage 41 that communicates the portion of the intake passage 20 downstream of the throttle valve 22 with the portion of the exhaust passage 30 upstream of the purifying device 31. The EGR device 40 has an EGR valve 42 that opens and closes the EGR passage 41. In addition, in the first embodiment, the EGR passage 41 is provided with an EGR cooler 43 for cooling the EGR gas passing through the EGR passage 41. The EGR gas is cooled by the EGR cooler 43 and then flows back to the intake passage 20.

(2) Control System (2-1) System Structure

Figure 2:
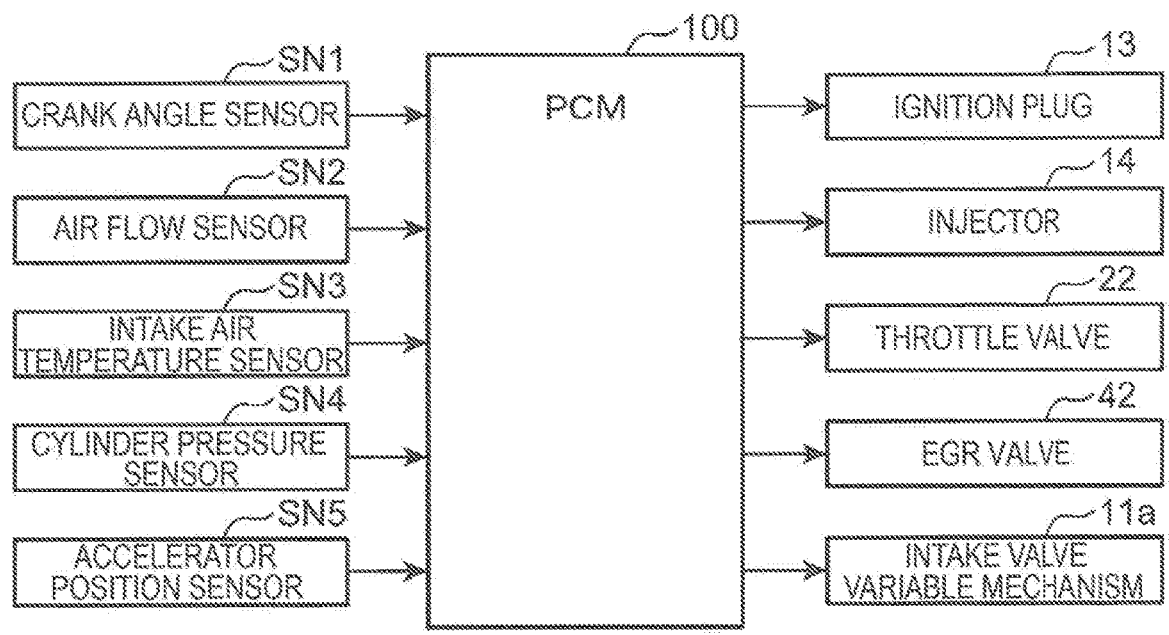
FIG. 2 is a block diagram illustrating the control system of an engine.

FIG. 2 is a block diagram illustrating the control system of the engine. The engine system according to the first embodiment is centrally controlled by the PCM (powertrain control module or control means) 100. As is well known, the PCM 100 is a microprocessor including a CPU, a ROM, a RAM, and the like.

Various sensors are provided in the vehicle and the PCM 100 is electrically connected to these sensors. For example, the cylinder block 3 is provided with a crank angle sensor SN1 that detects the rotation angle of the crankshaft 7 and furthermore the number of revolutions of the engine (the rotation speed of the engine). In addition, the intake passage 20 is provided with an air flow sensor SN2 and an intake air temperature sensor SN3 that detect the amount and the temperature of the air taken into each of the cylinders 2 through the intake passage 20. In addition, the cylinder head 4 is provided with cylinder pressure sensors SN4 that detect the cylinder pressures, which are the pressures in the combustion chambers 6. The cylinder pressure sensor SN4 is provided for each of the cylinders 2. In addition, the vehicle is provided with an accelerator position sensor SN5 that detects the opening (accelerator opening) of an accelerator pedal (not illustrated) operated by the driver.

The PCM 100 executes various calculations based on the input signals from these sensors SN1 to SN5 and the like, and controls individual portions of the engine, such as the spark plug 13, the injector 14, the throttle valve 22, the EGR valve 42, the intake valve variable mechanism 11a.

(2-2) Basic Control

Figure 3:
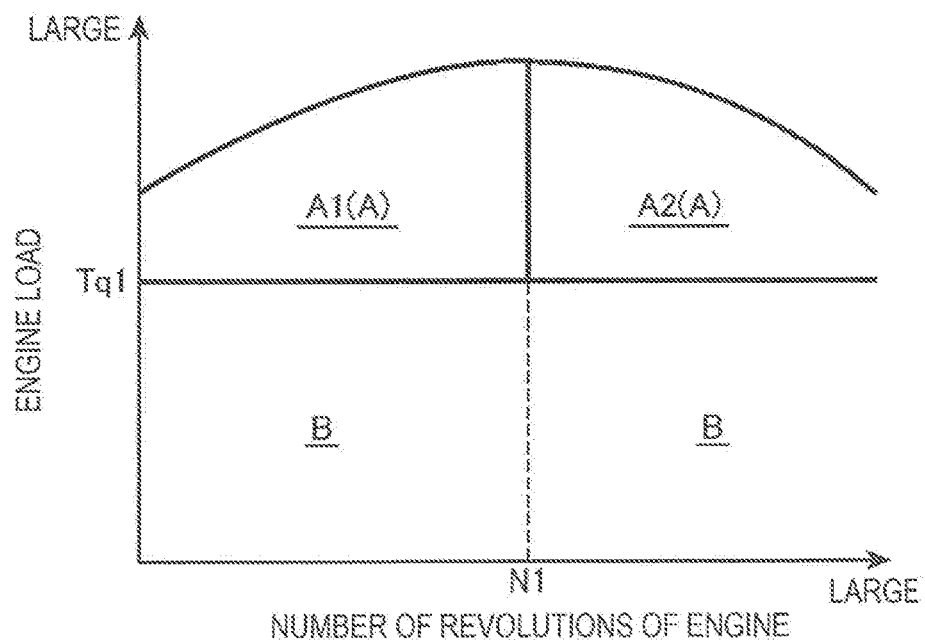
FIG. 3 is a diagram illustrating a control map.

FIG. 3 is a control map representing the number of revolutions of the engine on the horizontal axis and the engine load on the vertical axis. As illustrated in FIG. 3, the operation region of the engine is divided according to the control detail. The operation region of the engine is divided into a low-load region B in which the engine load is equal to or lower than a preset reference load (predetermined load) Tq1 and knocking is unlikely to occur and a high-load region A in which the engine load is higher than the reference load Tq1 and knocking is likely to occur. In the high-load region A, knock avoidance control, which will be described later, is performed to suppress the occurrence of knocking. In the first embodiment, since the geometric compression ratio of the engine body 1 is set to 15 or more as described above, the temperature in the combustion chamber 6 is raised to a very high temperature. Accordingly, knocking is particularly likely to occur. The high-load region A is further divided into a high-load low-speed region A1 in which the number of revolutions of the engine is less than a preset reference number of revolutions N1 and a high-load high-speed region A2 in which the number of revolutions of the engine is equal to or more than the reference number of revolutions N1.

In the low-load area B and the high-load low-speed area A1, spark-controlled compression ignition combustion (SPCCI combustion) is performed. In compression ignition combustion, first, fuel is injected into the combustion chamber 6 from the injector 14 before the compression top dead center (TDC). This fuel is mixed with air by the vicinity of the compression top dead center. In the vicinity of the compression top dead center, electric discharge is performed on this air-fuel mixture formed in the combustion chamber 6 from the spark plug 13. This forcibly ignites the air-fuel mixture around the spark plug 13. Then, flame propagates from around the spark plug 13 to the periphery and the temperature of the peripheral air-fuel mixture is raised and the air-fuel mixture undergoes self-ignition.

In contrast, since it becomes difficult to cause the air-fuel mixture to undergo self-ignition at a desired timing in the high-load high-speed region A2, SI combustion (spark ignition combustion) adopted in general gasoline engines is performed. SI combustion is a combustion mode in which almost the entire air-fuel mixture is turned by flame propagation, electric discharge via the spark plug 13 is performed in the vicinity of the compression top dead center and the air-fuel mixture around the spark plug 13 is forcibly ignited. Then, flame propagates from around the spark plug 13 to the periphery and the remaining air-fuel mixture is forcibly burned by the flame propagation.

In the low-load region B, the amount (referred to below as the injection amount as appropriate) of fuel injected into the combustion chamber 6 by the injector 14 is set so that the air-fuel ratio of the air-fuel mixture in the combustion chamber 6 becomes the theoretical air-fuel ratio. Specifically, the PCM 100 calculates the amount of air corresponding to the requested engine torque and changes the openings of the throttle valve 22 and the EGR valve 42 so as to achieve this amount of air. Next, the PCM 100 calculates the amount of air introduced to the combustion chamber 6, calculates the amount of fuel that achieves the theoretical air-fuel ratio with respect to this amount of air, and sets the injection amount to the calculated value.

Even in the high load region A, the injection amount is basically set so that the air-fuel ratio of the air-fuel mixture in the combustion chamber 6 becomes the theoretical air-fuel ratio.

(2-3) Knock Avoidance Control

Figure 4:
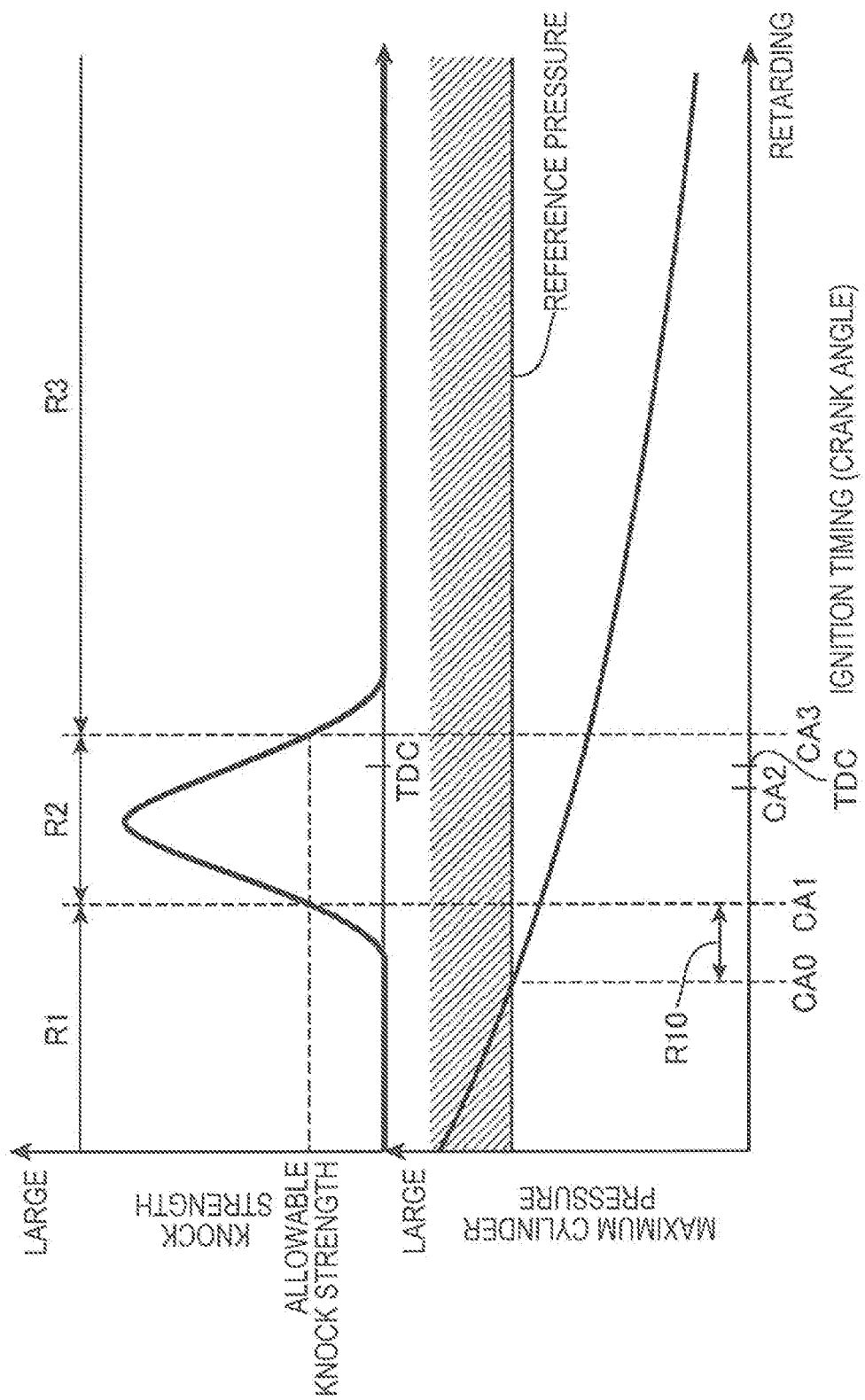
FIG. 4 is a graph illustrating the relationships between the ignition timing and the knock strength and between the ignition timing and the maximum cylinder pressure.
Figure 5A:
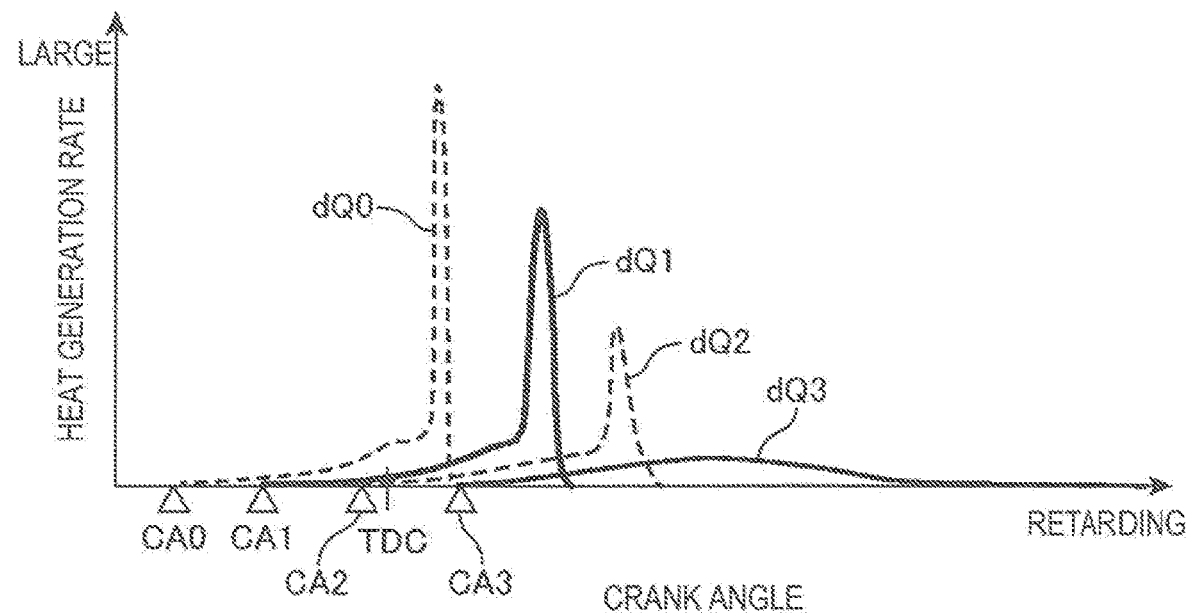
FIG. 5A is a diagram illustrating the heat generation rates at different ignition timings.
Figure 5B:
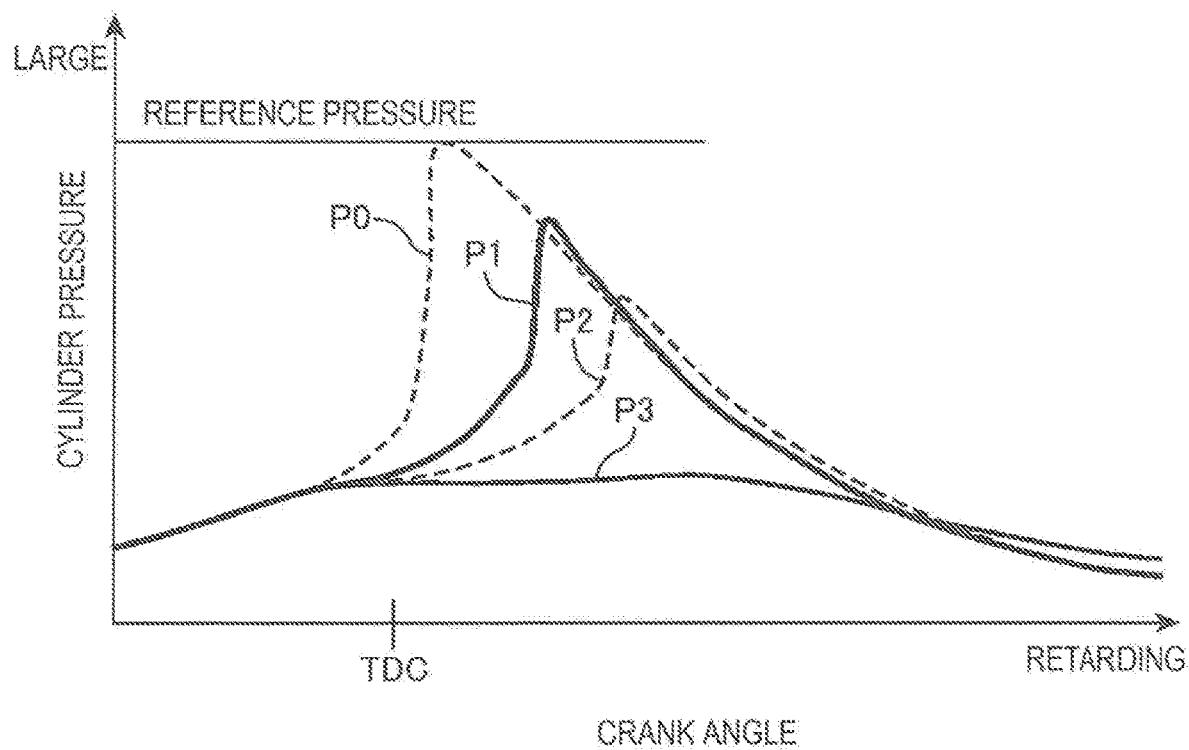
FIG. 5B is a diagram illustrating the cylinder pressures at different ignition timings.

An overview of knock avoidance control performed in the high-load region A will be explained with reference to FIG. 4, FIG. 5A, and FIG. 5B. The graph in the upper part in FIG. 4 illustrates the ignition timing (timing by the crank angle) at which the ignition plug 15 ignites the air-fuel mixture and the strength of knocking (referred to below as the knock strength). The graph in the lower portion in FIG. 4 illustrates the relationship between the ignition timing and the maximum cylinder pressure, which is the maximum value of cylinder pressure. FIG. 5A is a diagram illustrating the change in the heat generation rate with respect to the crank angle. In addition, FIG. 5B is a diagram corresponding to FIG. 5A and illustrates the change in the cylinder pressure with respect to the crank angle. The knock strength illustrated in FIG. 4 is the maximum value of the amplitude of the waveform of a predetermined frequency or higher included in the waveform of the cylinder pressure. The lines in FIG. 5A and FIG. 5B represent the heat generation rate and the cylinder pressure, respectively, under operating conditions with different ignition timings.

The ignition timing is preferably set to the MBT (minimum spark advance for best torque) at which the engine torque is maximized to improve the fuel efficiency performance (to increase the engine torque). However, since the temperature and the pressure in the combustion chamber 6 become high in the high-load region A, knocking is likely to occur when the ignition timing is set to the MBT. In particular, in a high compression ratio engine with a geometric compression ratio of 15 or more, since the temperature and the pressure in the combustion chamber 6 become high in the high-load region A, knocking always occurs when the ignition timing is set to the MBT, combustion occurs steeply, and the combustion noise and the amount of NOx production tend to increase. In contrast, when the ignition timing is set to a timing considerably later than the MBT (timing within the expansion stroke), since combustion can be caused when the temperature and the pressure in combustion chamber 6 are kept low, knocking can be suppressed and the combustion noise and the amount of NOx production can be suppressed.

Here, "knocking occurs (occurred)" in this specification and claims means that unacceptable knocking occurs and includes both cases in which knocking simply occurs (occurred) and in which unacceptable knocking occurs (occurred).

Because of the description above, the reference ignition timing that is the basic ignition timing is set to a timing on the retarded side of the MBT in the high-load region A as described later.

However, when, for example, the air-fuel ratio of an air-fuel mixture in the combustion chamber 6 deviates from a desired value during acceleration or the like, knocking may occur even if the ignition timing is set to the reference ignition timing. In such a case, knocking can be suppressed by further retarding the ignition timing. However, if the ignition timing is changed to a timing on the retarded side of the reference ignition timing when the reference ignition timing is set on the retarded side of the MBT, since more air-fuel mixtures are burned at timings much retarded from the compression top dead center (that is, the combustion gravity center timing is much retarded from the compression top dead center), the engine torque is significantly reduced (the fuel efficiency performance is extremely degraded). The combustion gravity center timing is the timing (crank angle) at which the heat generation is 50% of the total heat generation during one combustion cycle. In addition, the combustion gravity center timing is the crank angle at which the rise in the cylinder pressure due to combustion reaches substantially the peak.

In contrast, the inventors et al. have found as a result of earnest research that, when the ignition timing is advanced from a timing (at which knocking does not occur) on the retarded side of the MBT, knocking starts occurring (the knocking strength increases) when the ignition timing is advanced by a predetermined amount, but knocking no longer occurs (the knock strength becomes smaller) when the ignition timing is further advanced. That is, as illustrated in the graph in the upper portion in FIG. 4, it has been found that the knock strength becomes larger (the knock strength becomes larger than a predetermined allowable knock strength defined by the reliability of the engine and the like) when the ignition timing is set in a predetermined knock region R2, and the knock strength can become smaller (the knock strength can be made smaller than the allowed knock strength) when the ignition timing is set in a retarded side region R3 on the retarded side of the knock region R2 and an advanced side region R1 on the advanced side of the knock region R2. It should be noted here that the allowable knock strength is the maximum value of the knock strength within which the reliability of the engine can be ensured and is defined based on the reliability of the engine and the like. This allowable knock strength may be 0. As illustrated in the FIG. 4, the knock region R2 includes the compression top dead center. In addition, the MBT is present in the knock region R2 in FIG. 4. For example, the MBT is a timing substantially in the middle of the knock region R2.

The reason why the knock strength can be reduced (the knocking can be avoided) by advancing the ignition timing to the timing in the advanced side region R1 is considered as follows. When the ignition timing is set to a timing sufficiently on the advanced side, some fuel will burn early because, for example, ignition energy is given when the combustion chamber 6 is at a higher temperature and a higher pressure. As a result, the amount of fuel that is locally overheated in, for example, the outer periphery of the combustion chamber 6 and causes knocking is reduced. Accordingly, when the ignition timing is set to a timing sufficiently on the advanced side, the knock strength becomes smaller.

In addition, the inventors et al. have found that, even when knocking does not occur similarly (even when the knock strength is at the same level), the engine torque when the ignition timing set to a timing in the advanced side region R1 becomes higher than the engine torque when the ignition timing is set to a timing in the retarded side region R3 even if some reverse torque is applied to the engine.

This is because most of the air-fuel mixture is burned in a timing closer to the compression top dead center (the combustion gravity center timing becomes closer to the compression top dead center) when the ignition timing is set in the advanced side region R1 than when the ignition timing is set in the retarded side region R3, and the combustion temperature becomes higher and the combustion speed becomes faster.

Specifically, the heat generation rate dQ1 in the FIG. 5A is the heat generation rate when the ignition timing is set to a first timing CA1, which is the timing on the most retarded side among the timings included in the advanced side region R1. The heat generation rate dQ0 in FIG. 5A is the heat generation rate when the ignition timing is set to a limit timing CA0 on the advanced side of the first timing CA1. The heat generation rate dQ2 in FIG. 5A is the heat generation rate when the ignition timing is set to a second timing CA2, which is the timing on the retarded side among the timings included in the knock region R2. The heat generation rate dQ3 in FIG. 5A is the heat generation rate when the ignition timing is set to a third timing CA3, which is the timing on the most advance side among the timings, on the retarded side of the second timing CA2, that are included in the retarded side region R3.

As is clear from the comparison of the heat generation rates in FIG. 5A, when the ignition timing is set to the third timing CA3, which is the timing on the most advanced side among the timings in the retarded side region R3, the combustion period becomes very long as represented by the heat generation rate dQ3. In contrast, when the ignition timing is set to the first timing CA1 included in the advanced side region R1, the combustion period becomes short as represented by the heat generation rate dQ1.

When the ignition timing is set to a timing, on the retarded side of the third timing CA3, that is included in the retarded side region R3 to avoid knocking, most of the air-fuel mixture burns in the state in which the amount of drop from the compression top dead center of the piston 5 is large at the timing separated from the compression top dead center relatively greatly. Accordingly, the combustion energy cannot be efficiently converted into the force for pushing down the piston 5. In contrast, when the ignition timing is set to the first timing CA1 included in the advanced side region R1, the combustion energy can be efficiently converted into the force for pushing down the piston 5 because combustion occurs mainly near the compression top dead center, so the engine torque can be made high.

In addition, the change in the volume of the combustion chamber 6 with respect to the change in the crank angle becomes larger as the separation from the compression top dead center is larger (in the second half of the compression stroke and the first half of the expansion stroke). Accordingly, when the ignition timing is set to a timing in the retarded side region R3, the amount of the change in the volume of the combustion chamber 6 at the timing (combustion gravity center timing) at which most of the air-fuel mixture burns with respect to the retarded amount of the ignition timing increases. Accordingly, when the ignition timing is set to a timing in the retarded side region R3, the amount of reduction in the engine torque with respect to the retarded amount when the ignition timing is retarded also increases.

On the other hand, as illustrated in FIG. 4 and FIG. 5B, the maximum cylinder pressure rises as the ignition timing is advanced. It is known that the piston 5 and the like may be damaged if the maximum cylinder pressure exceeds a predetermined pressure. Accordingly, the maximum cylinder pressure needs to be kept at this predetermined pressure (reference pressure) or lower. Specifically, the cylinder pressures P0, P1, P2, and P3 in FIG. 5B correspond to the heat generation rates dQ0, dQ1, dQ2, and dQ3 in FIG. 5A, respectively, and indicate the cylinder pressures when the ignition timings are set to the limit timing CA0, the first timing CA1, the second timing CA2, and the third timings CA3, respectively. In the example in FIG. 5B, when the ignition timing is advanced to the limit timing CA0, the maximum cylinder pressure rises to the predetermined pressure described above.

Accordingly, the range in which the maximum cylinder pressure can be suppressed to the predetermined pressure or lower and the knock strength can be kept at the allowable knock strength or smaller, that is, the range within which the ignition timing can be set, is a region R10 that is a part of the advanced side region R1. This region R10 is a very narrow range.

From the above findings, in the first embodiment, the ignition timing is basically set to a timing on the retarded side of the MBT in the high-load region A. That is, the reference ignition timing is set to a timing on the retarded side of the MBT. When the knock strength exceeds the allowable knock strength even (that is, unacceptable knocking may occur or unacceptable knocking actually occurs) if ignition is performed, the ignition timing is advanced to a timing included in the advanced side region R1 without being retarded from reference ignition timing. This can maintain a high engine torque (maintain high fuel efficiency performance) while avoiding knocking.

A specific flow of knock avoidance control will be described using the flowchart in FIG. 6. The individual steps of this flowchart are executed when the engine is operated in the high-load region A. That is, the PCM 100 determines the operation region in which the engine is being operated based on the current number of revolutions of the engine and the current engine load. When determining that the engine is being operated in the high-load region A, the PCM 100 executes step S1. In this determination step, the value detected by the crank angle sensor SN1 is used as the number of revolutions of the engine. The engine load is calculated based on the accelerator opening detected by the accelerator position sensor SN5 and the number of revolutions of the engine.

In step S1, the PCM 100 first sets the reference ignition timing. The reference ignition timing is set and stored in the PCM 100 in advance. As described above, the reference ignition timing is set to a timing on the retarded side of the MBT. For example, the reference ignition timing is set to the third timing CA3, which is the timing on the most advanced side among the timings included in the retarded side region R3.

The reference ignition timing for the number of revolutions of the engine and the engine load is determined via an experiment or the like and stored in the PCM 100 as a map. In step S1, the PCM 100 extracts the reference ignition timing corresponding to the current number of revolutions of the engine and the current engine load from this map.

Next to step S1, the processing proceeds to step S2. In step S2, the PCM 100 determines (predicts) whether knocking occurs.

The PCM 100 predicts whether knocking occurs based on the combustion gravity center timing (referred to below as the current combustion gravity center timing) calculated finally and the state quantities of the gas in the combustion chamber 6. The combustion gravity center timing can be obtained by calculating the heat generation amount using the cylinder pressure.

Specifically, the PCM 100 always calculates the combustion gravity center timing using the cylinder pressure detected by the cylinder pressure sensor SN4. The combustion gravity center timing is calculated after the combustion is completed (for example, after the expansion stroke is completed). The PCM 100 calculates the difference between the calculated current combustion gravity center timing and the reference value stored in advance. This reference value is the combustion gravity center timing obtained when the wall temperature of the combustion chamber 6 and the like are predetermined values, the amount of the EGR gas in the combustion chamber 6 and the amount of the fuel supplied to combustion chamber 6 are identical to command values, and ignition is performed accurately at the reference ignition timing. This reference value is obtained in advance for the number of revolutions of the engine and the engine load via an experiment or the like and stored in the PCM 100.

In addition, the PCM 100 estimates, as the state quantities of gas in combustion chamber 6, the amount of intake air, the temperature of intake air, the amount of EGR gas, and the like in the combustion chamber 6 after the intake valve 11 is closed. These are estimated based on the detection value of the air flow sensor SN2, the detection value of the crank angle sensor SN1, the detection value of the intake air temperature sensor SN3, the command value of the opening of the EGR valve 42, and the like.

The PCM 100 predicts whether knocking occurs based on the difference between the calculated combustion gravity center timing and the reference value and the estimated state quantities of gas in the combustion chamber 6. For example, when the detected combustion gravity center timing is significantly on the advanced side of the reference value or when the temperature of intake air is high, the air-fuel mixture is easier to burn than expected and knocking is predicted to occur.

When the determination in step S2 is NO and knocking is not predicted to occur even if ignition is performed at the reference ignition timing, the processing proceeds to step S11. In step S11, the PCM 100 determines the ignition timing to be the reference ignition timing and causes the spark plug 13 to perform ignition at the reference ignition timing.

When the determination in step S2 is YES and knocking is predicted to occur, the processing proceeds to step S3.

In step S3, the PCM 100 sets the first ignition timing (advanced side ignition timing) and the third ignition timing (retarded side ignition timing) as candidates for the ignition timing.

The third ignition timing is set to a timing on the retarded side of the compression top dead center, on the retarded side of the reference ignition timing, and in the retarded side region R3. The PCM 100 sets the third ignition timing to the timing obtained by retarding the reference ignition timing set in step S1 by the preset first angle. When the determination in step S2 is YES and knocking is predicted to occur, the reference ignition timing is present in the knock region R2 in which knocking occurs (the knock strength exceeds the allowable knock strength). In addition, the reference ignition timing is set to a timing on the retarded side of the MBT. Accordingly, when the ignition timing is set to the third ignition timing on the retarded side of the reference ignition timing and ignition is performed at this timing, since the combustion gravity center timing is more retarded in the expansion stroke than when the ignition timing is set to the reference ignition timing, knocking is less likely to occur.

The first ignition timing is set to a timing on the advanced side of the reference ignition timing in the advanced side region R1. In the first embodiment, the first ignition timing is set to the timing on the most retarded side among the ignition timings included in the advanced side region R1, that is, the timing corresponding to the first timing CA1 described above. As described above, when ignition is performed at the first timing CA1 to be set as the first ignition timing, knocking does not occur and the fuel efficiency performance becomes relatively high (the obtained engine torque becomes relatively high).

Next to step S3, the processing proceeds to step S4. In step S4, the PCM 100 predicts the maximum cylinder pressure Pmax when the ignition timing is the first ignition timing and determines whether the predicted maximum cylinder pressure Pmax is equal to or less than the reference pressure. The piston 5 and the like may be damaged when the cylinder pressure exceeds the reference pressure, which is the predetermined pressure, and the predetermined pressure is set and stored in advance in the PCM 100.

The PCM 100 predicts the maximum cylinder pressure Pmax when ignition timing is set to first ignition timing based on the current combustion gravity center timing, the state quantities of gas in the combustion chamber 6, and the first ignition timing set in step S3. Then, the PCM 100 compares this predicted value with the reference pressure.

When the determination in step S4 is YES and the predicted value of the maximum cylinder pressure Pmax when the ignition timing is the first ignition timing is equal to or less than the reference pressure, the processing proceeds to step S5. In step S5, the PCM 100 predicts the maximum value of $dP/d\theta$ (P: cylinder pressure, $\theta$: crank angle) that is the increase rate (increase amount of the cylinder pressure per unit crank angle) of the cylinder pressure when the ignition timing is the first ignition timing, and determines whether the predicted maximum value of $dP/d\theta$ is equal to or less than the reference pressure increase rate. When $dP/d\theta$ exceeds the reference pressure increase rate, the combustion noise exceeds a predetermined level and the reference pressure increase rate is set and stored in advance in the PCM 100.

The PCM 100 predicts the maximum value of $dP/d\theta$ when the ignition timing is the first ignition timing based on the current combustion gravity center timing, the state quantities of gas in the combustion chamber 6, and the first ignition timing set in the step S3.

When the determination in step S5 is YES and the predicted value of the maximum value of the increase rate $dP/d\theta$ of the cylinder pressure when the ignition timing is the first ignition timing is equal to or less than the reference pressure increase rate, the processing proceeds to the step S6. In step S6, the PCM 100 determines the ignition timing to be the first ignition timing. Then, the PCM 100 causes the spark plug 13 to perform ignition at the first ignition timing. That is, the PCM 100 performs ignition advance control that causes the spark plug 13 to perform ignition at the first ignition timing, which is a timing on the advanced side of the reference ignition timing.

In contrast, when the determination in step S4 is NO or the determination in step S5 is NO, if the maximum cylinder pressure Pmax (predicted value) when the ignition timing is the first ignition timing exceeds the reference pressure or if the maximum value (predicted value) of the increase rate $dP/d\theta$ of the cylinder pressure when the ignition timing is the first ignition timing exceeds the reference pressure increase rate, the processing proceeds to the step S10.

In step S10, the PCM 100 determines the ignition timing to be the third ignition timing and causes the spark plug 13 to perform ignition at the third ignition timing on the retarded side of the reference ignition timing.

As described above, in the first embodiment, when knocking is predicted to occur due to ignition at the reference ignition timing, as long as the maximum cylinder pressure Pmax does not exceed the reference pressure and the maximum value of $dP/d\theta$ does not exceed the reference pressure increase rate, the ignition timing is set to the first ignition timing on the advanced side of the reference ignition timing and the air-fuel mixture is ignited at this first ignition timing. In contrast, when knocking is predicted to occur due to ignition at the reference ignition timing, if the maximum cylinder pressure Pmax exceeds the reference pressure or the maximum value of $dP/d\theta$ exceeds the reference pressure increase rate when the ignition timing is set to the first ignition timing, the ignition timing is set to the third ignition timing on the retarded side of the reference ignition timing and the air-fuel mixture is ignited at this third ignition timing. Then, only when knocking is not predicted to occur due to ignition at the reference ignition timing, the air-fuel mixture is ignited at the reference ignition timing.

As described above, in the first embodiment, when knocking occurs due to ignition at the reference ignition timing set on the retarded side of the MBT in the high-load region A, the first ignition timing, on the advanced side of the reference ignition timing, that is included in the advanced side region R1 is set as one of candidates for the ignition timing. When the maximum cylinder pressure does not exceed the reference pressure and the maximum value of $dP/d\theta$ does not exceed the reference pressure increase rate due to ignition at this first ignition timing, the air-fuel mixture is ignited at this first ignition timing.

Accordingly, as compared with the case in which the ignition timing is set to a timing on the retarded side of the reference ignition timing and the air-fuel mixture is ignited at a timing on the retarded side of the reference ignition timing, knocking can be prevented while high fuel efficiency performance is maintained.

In addition, in the first embodiment, when the maximum cylinder pressure Pmax is not predicted to exceed the reference pressure, the ignition timing is set to the first ignition timing. Accordingly, it is possible to prevent the maximum cylinder pressure Pmax from exceeding the reference pressure and adverse effects from being exerted on the piston 5 and the like because the ignition timing is set to the first ignition timing.

In addition, in the first embodiment, when the maximum value of $dP/d\theta$ is not predicted to exceed the reference pressure increase rate, the ignition timing is set to the first ignition timing. Accordingly, it is possible to prevent $dP/d\theta$ from becoming the reference pressure increase rate or more and the combustion noise from exceeding a desired level because the ignition timing is set to the first ignition timing.

In addition, when knocking occurs due to ignition at the reference ignition timing, if the maximum cylinder pressure Pmax exceeds the reference pressure or the maximum value of $dP/d\theta$ exceeds the reference pressure increase rate due to ignition at first ignition timing, the air-fuel mixture is ignited at the third ignition timing on the retarded side of the reference ignition timing. Accordingly, although the fuel efficiency performance is lower than ignition at the first ignition timing, knocking can be surely prevented while adverse effects on the piston 5 and the like and the degradation of combustion noise are prevented.

(3) Second Embodiment

Figure 6:
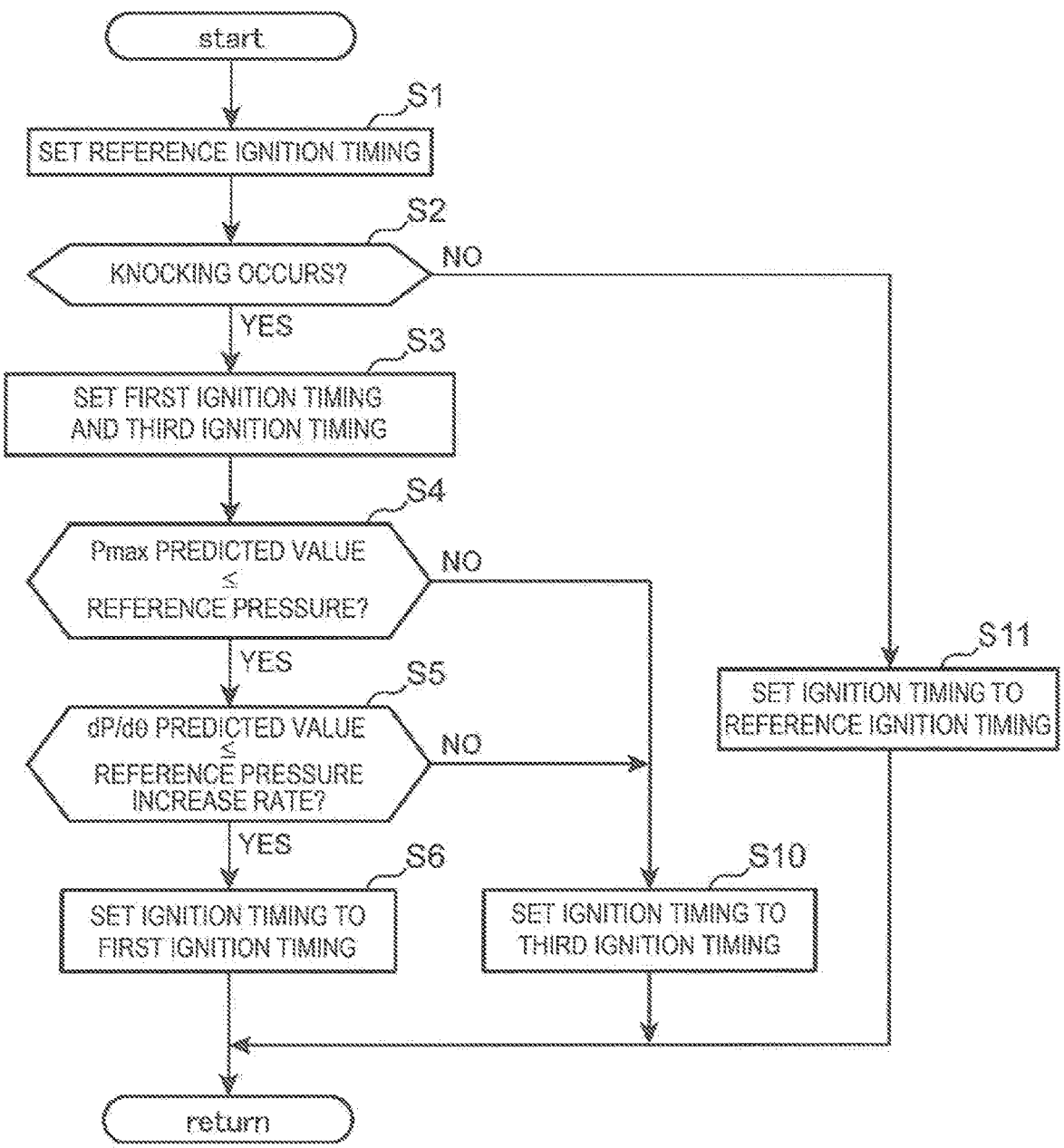
FIG. 6 is a flowchart illustrating the procedure of knock avoidance control.
Figure 7:
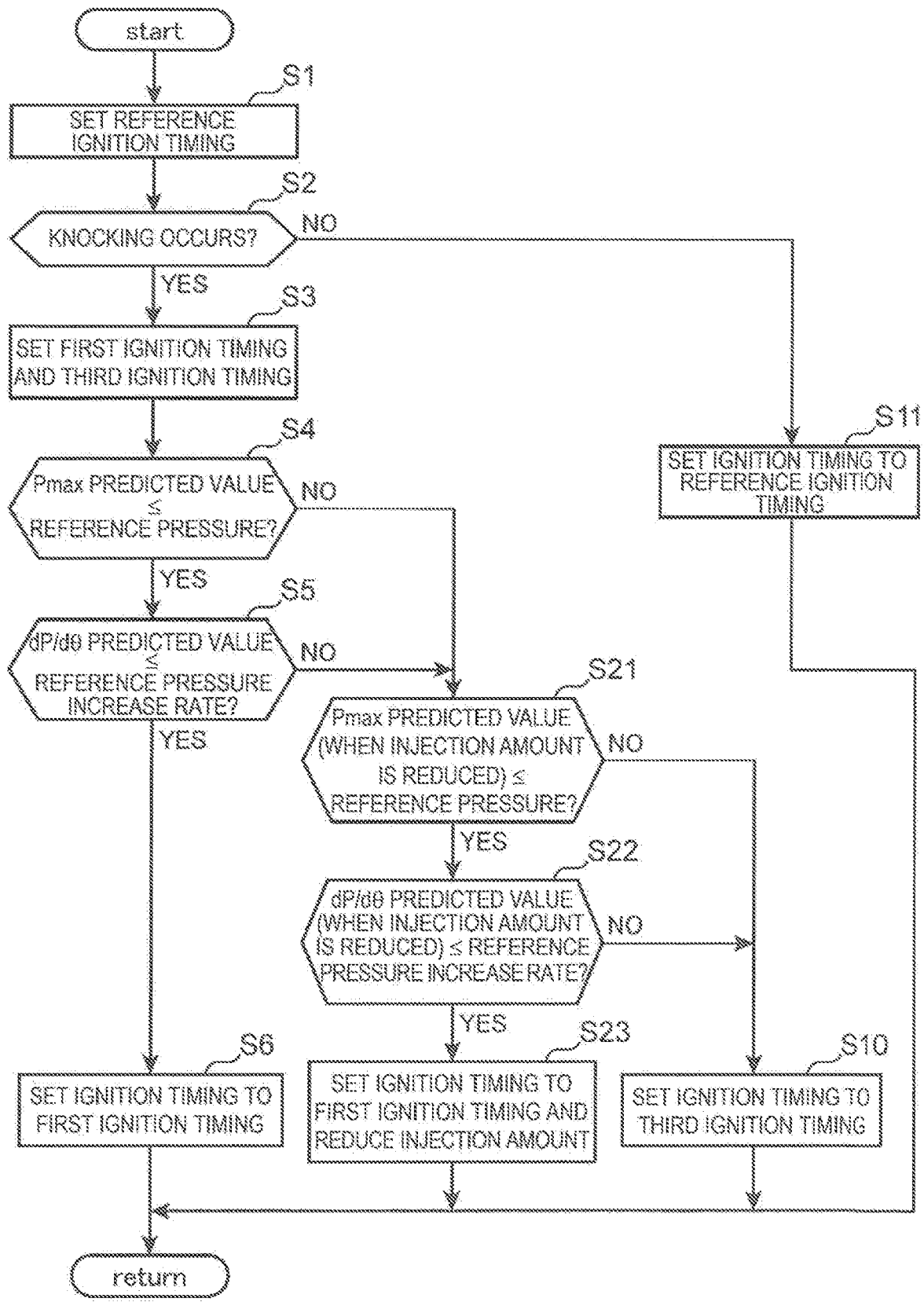
FIG. 7 is a flowchart illustrating the procedure of knock avoidance control according to a second embodiment.

FIG. 7 is a flowchart illustrating knock avoidance control according to a second embodiment. An engine system according to the second embodiment is different from the engine system according to the first embodiment only in the detail of knock avoidance control and the other structure is the same between the first embodiment and the second embodiment. In the second embodiment, the control details of the steps (steps S21, S22, and S23) to which the processing proceeds when the determination in step S4 or step S5 is NO are different from those in the first embodiment. That is, between the first embodiment and the second embodiment, the control details in the case in which the maximum cylinder pressure Pmax (predicted value) when the ignition timing is the first ignition timing exceeds the reference pressure or in the case in which the maximum value (predicted value) of the increase rate dP/dθ of the cylinder pressure when the ignition timing is first ignition timing exceeds the reference pressure increase rate is different. The control details (steps other than steps S21, S22, and S23) other than this are the same between the first embodiment and the second embodiment, so the detailed descriptions of the steps other than steps S21, S22, and S23 are omitted here. In FIG. 7, the same steps (the same steps as in the first embodiment) as in the flowchart in FIG. 6 are denoted by the same numerals as in FIG. 6.

In the second embodiment, if the determination in the step S4 or the step S5 is NO (if the maximum cylinder pressure Pmax (predicted value) when the ignition timing is the first ignition timing is determined to exceed the reference pressure or if the maximum value (predicted value) of the increase rate dP/dθ of the cylinder pressure when the ignition timing is the first ignition timing is determined to exceed the reference pressure increase rate), the processing proceeds to step S21.

In step S21, the PCM 100 predicts the maximum cylinder pressure Pmax when the ignition timing is the first ignition timing and the injection amount of the injector 14 is reduced by a preset reference reduction amount from the reference injection amount (referred to below as "the injection amount is reduced") and determines whether the predicted maximum cylinder pressure Pmax is equal to or less than the reference pressure. The basic injection amount is the injection amount of the injector 14 during normal operation (during operation excluding the execution of step S23 described later) and is the amount of fuel corresponding to the requested engine torque. The reference reduction amount is, for example, approximately 10% or less of the basic injection amount and is set and stored in advance in the PCM 100.

When the determination in step S21 is YES and the predicted maximum cylinder pressure Pmax is equal to or less than the reference pressure, the processing proceeds to step S22. In step S22, the PCM 100 predicts the maximum value of dP/dθ when the ignition timing is the first ignition timing (ignition advance control is performed) and the injection amount is reduced, and determines whether the predicted maximum value of dP/dθ is equal to or less than the reference pressure increase rate.

When the determination in step S22 is YES and the predicted maximum value of dP/dθ is equal to or less than the reference pressure increase rate, the processing proceeds to the step S23. In step S23, the PCM 100 sets the ignition timing to the first ignition timing (performs ignition advance control). In addition, in step S23, the PCM 100 sets the injection amount of the injector 14 to the amount obtained by reducing the basic injection amount by the reference reduction amount. Then, the PCM 100 causes the spark plug 13 to ignite the air-fuel mixture at the first ignition timing and causes the injector 14 to inject the amount of fuel obtained by reducing the basic injection amount by the reference reduction amount.

In contrast, when the determination in step S21 is NO or the determination in step S22 is NO, the processing proceeds to step S10 and the PCM 100 sets the ignition timing to the third ignition timing. That is, when the ignition timing is set to the first ignition timing and it is predicted that the maximum cylinder pressure Pmax when the injection amount is reduced exceeds the reference pressure or the maximum value of dP/dθ in the above case exceeds the reference pressure increase rate, the PCM 100 sets the ignition timing to the third ignition timing in the step S10. Then, the PCM 100 causes the spark plug 13 to ignite the air-fuel mixture at the third ignition timing. When the processing proceeds to step S10, the PCM 100 sets the injection amount to the basic injection amount and causes the injector 14 to inject the basic injection amount of fuel. In addition, when the processing proceeds to step S6 or step S11, the PCM 100 sets the injection amount to the basic injection amount and causes the injector 14 to inject the basic injection amount of fuel.

Since the combustion amount reduces when the injection amount of the injector 14 reduces, the maximum cylinder pressure Pmax and dP/dθ also reduce. In contrast, as described above, in the second embodiment, even when knocking is predicted to occur due to ignition at the first ignition timing in the high-load region A and it is predicted that the maximum cylinder pressure Pmax exceeds the reference pressure or the maximum value of dP/dθ exceeds the reference pressure increase rate, if the maximum cylinder pressure Pmax becomes equal to or less than the reference pressure and the maximum value of dP/dθ becomes equal to or less than the reference pressure increase rate by reducing the injection amount of the injector 14 by the reference reduction amount from the basic injection amount, the air-fuel mixture is ignited at the first ignition timing while reducing the injection amount of the injector by the reference reduction amount from the basic injection amount. Then, when the maximum cylinder pressure Pmax exceeds the reference pressure or the maximum value of dP/dθ exceeds the reference pressure increase rate due to ignition at the first ignition timing even if the injection amount of the injector 14 is reduced by the reference reduction amount from the basic injection amount, the ignition timing is set to the third ignition timing.

According to the second embodiment, when the control described above is performed, it is possible to increase opportunities to perform ignition at the first ignition timing while preventing adverse effects from being exerted on the piston 5 and the like and preventing combustion noise from exceeding a desired level. Accordingly, it is possible to further improve the fuel efficiency performance while suppressing knocking.

(4) Third Embodiment

Figure 8:
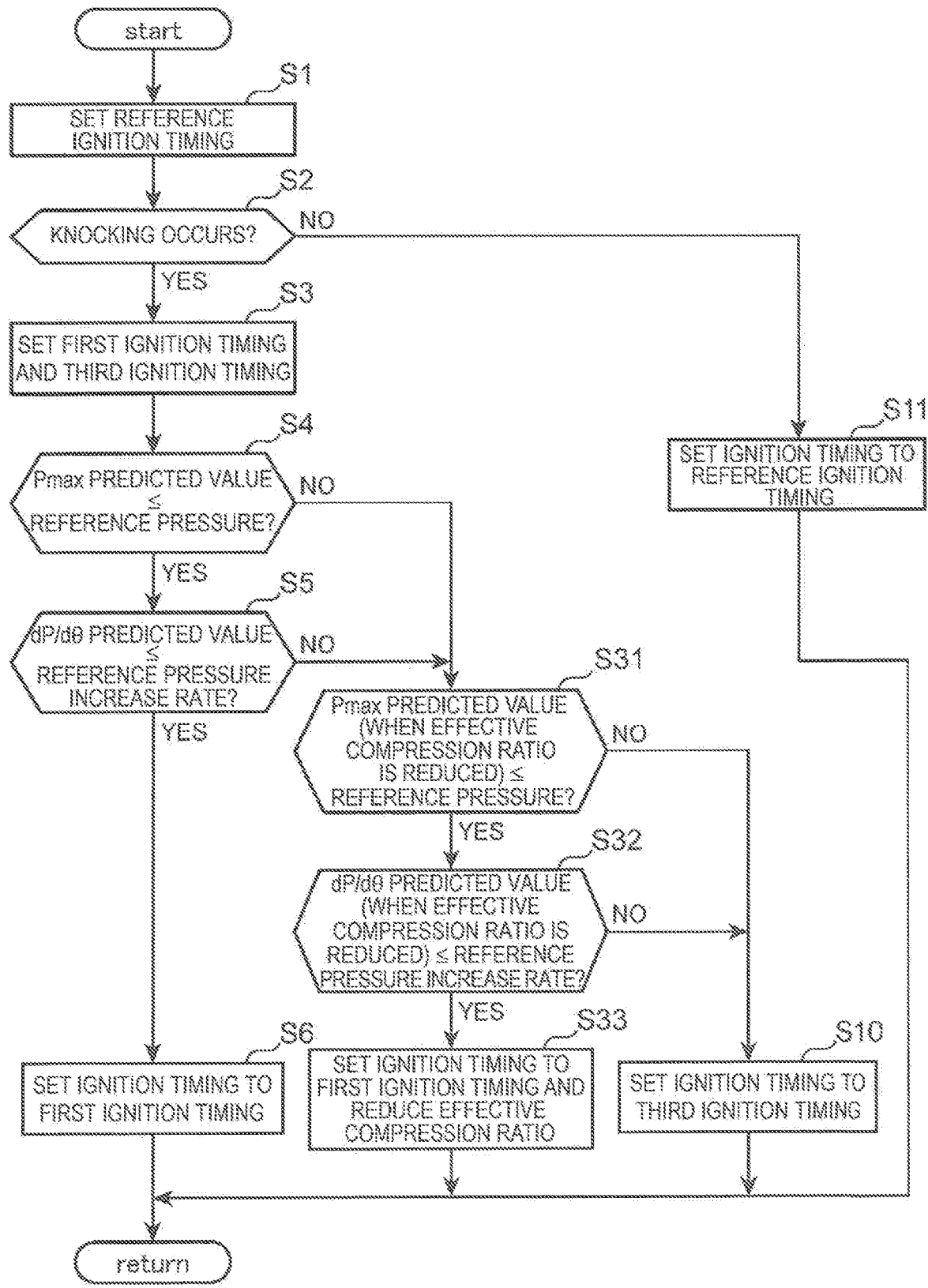
FIG. 8 is a flowchart illustrating the procedure of knock avoidance control according to a third embodiment.

Instead of the first embodiment and the second embodiment, the control details of knock avoidance control may be configured as illustrated in FIG. 8. FIG. 8 is a flowchart illustrating knock avoidance control according to a third embodiment. An engine system according to the third embodiment is different from the engine systems according to the first and second embodiments only in a part of knock avoidance control and the other structure is the same between the first embodiment and the second embodiment. In the third embodiment, the control details of the steps (steps S31, S32, and S33) to which the processing proceeds when the determination in step S4 or step S5 is NO are different from those in the first embodiment. On the other hand, the steps other than these steps S31, S32, and S33 are the same as the steps with the same numerals in the first embodiment. Accordingly, the descriptions of the steps other than the steps S31, S32, and S33 are omitted here. In FIG. 7, the same steps (the same steps as in the first embodiment) as in the flowchart in FIG. 6 are denoted by the same numerals as in FIG. 6.

In the third embodiment, if the determination in step S4 or step S5 is NO (if the maximum cylinder pressure Pmax (predicted value) when the ignition timing is the first ignition timing is determined to exceed the reference pressure or if the maximum value (predicted value) of the increase rate $dP/d\theta$ when the ignition timing is the first ignition timing is determined to exceed the reference pressure increase rate), the processing proceeds to step S31.

In step S31, the PCM 100 predicts the maximum cylinder pressure Pmax when the ignition timing is the first ignition timing and the effective compression ratio of the cylinder 2 is the ignition advance compression ratio and determines whether the predicted maximum cylinder pressure Pmax is equal to or less than the reference pressure. The ignition advance compression ratio is set to a value smaller than the effective compression ratio (normal effective compression ratio) when step S33 described later is not performed. For example, when step S33 is not performed, the effective compression ratio is substantially identical to the geometric compression ratio. On the other hand, the ignition advance compression ratio is set to a value approximately 0.65 to 0.8 times the geometric compression ratio. In this embodiment, the geometric compression ratio is 15 while the ignition advance compression ratio is set to a value between 10 and 12 (for example, 11), inclusive.

When the determination in step S31 is YES and the predicted maximum cylinder pressure Pmax is equal to or less than the reference pressure, the processing proceeds to step S32. In step S32, the PCM 100 predicts the maximum value of $dP/d\theta$ when the ignition timing is the first ignition timing (ignition advance control is performed) and the effective compression ratio of the cylinder 2 is the ignition advance compression ratio and determines whether the predicted maximum value of $dP/d\theta$ is equal to or less than the reference pressure increase rate.

When the determination in step S32 is YES and the predicted maximum value of $dP/d\theta$ is equal to or less than the reference pressure increase rate, the processing proceeds to step S33. In step S33, the PCM 100 sets ignition timing to the first ignition timing (performs ignition advance control). Then, the PCM 100 causes the spark plug 13 to ignite the air-fuel mixture at the first ignition timing.

In addition, in step S33, the PCM 100 changes the effective compression ratio of the cylinder 2 to the ignition advance compression ratio. Specifically, the PCM 100 changes the closing timing of the intake valve 11 via the intake valve variable mechanism 11a so that the effective compression ratio is set to the ignition advance compression ratio. As described above, the effective compression ratio when step S33 is not performed is larger than the ignition advance compression ratio. Accordingly, in step S33, the effective compression ratio is smaller than in normal times. In the third embodiment, in the high-load region A, the closing timing of the intake valve 11 in normal times is set to a timing on the retarded side of the intake bottom dead center. Accordingly, in step S33, the PCM 100 retards the closing timing of the intake valve 11 than the closing timing in normal times, thereby reducing the effective compression ratio.

In contrast, when the determination in step S31 is NO or the determination in step S32 is NO, the processing proceeds to step S10 and the PCM 100 sets the ignition timing to the third ignition timing. That is, if it is predicted that the maximum cylinder pressure Pmax when the ignition timing is set to the first ignition timing and the effective compression ratio of the cylinder 2 is reduced exceeds the reference pressure or the maximum value of $dP/d\theta$ in the above case exceeds the reference pressure increase rate, the PCM 100 sets the ignition timing to the third ignition timing in the step S10. Then, the PCM 100 causes the spark plug 13 to ignite the air-fuel mixture at the third ignition timing. It should be noted here that the effective compression ratio is the effective compression ratio in normal times in step S10. In addition, when the processing proceeds to step S6 or step S11, the effective compression ratio is also the effective compression ratio in normal times. In addition, in the third embodiment, the injection amount is always set to the basic injection amount.

Since the cylinder pressure reduces as the effective compression ratio reduces, the maximum cylinder pressure Pmax and $dP/d\theta$ also reduce. In contrast, as described above, in the third embodiment, even if knocking is predicted to occur when ignition is performed at the first ignition timing in the high-load region A and it is predicted that the maximum cylinder pressure Pmax exceeds the reference pressure or the maximum value of $dP/d\theta$ exceeds the reference pressure increase rate, when the maximum cylinder pressure Pmax becomes equal to or less than the reference pressure and the maximum value of $dP/d\theta$ becomes equal to or less than the reference pressure increase rate by reducing the effective compression ratio to the ignition advance compression ratio or less, the air-fuel mixture is ignited at the first ignition timing while the effective compression ratio is reduced to the ignition advance compression ratio. Even when the effective compression ratio is reduced to the ignition advance compression ratio, if the maximum cylinder pressure Pmax exceeds the reference pressure or the maximum value of $dP/d\theta$ exceeds the reference pressure increase rate due to ignition at the first ignition timing, the ignition timing is set to the third ignition timing.

According to the third embodiment, it is possible to increase opportunities to perform ignition at the first ignition timing while preventing adverse effects from being exerted on the piston 5 and the like and preventing combustion noise from exceeding a desired level by performing the control described above. Accordingly, the fuel efficiency performance can be further improved while knocking is suppressed.

(5) Fourth Embodiment

Figure 9:
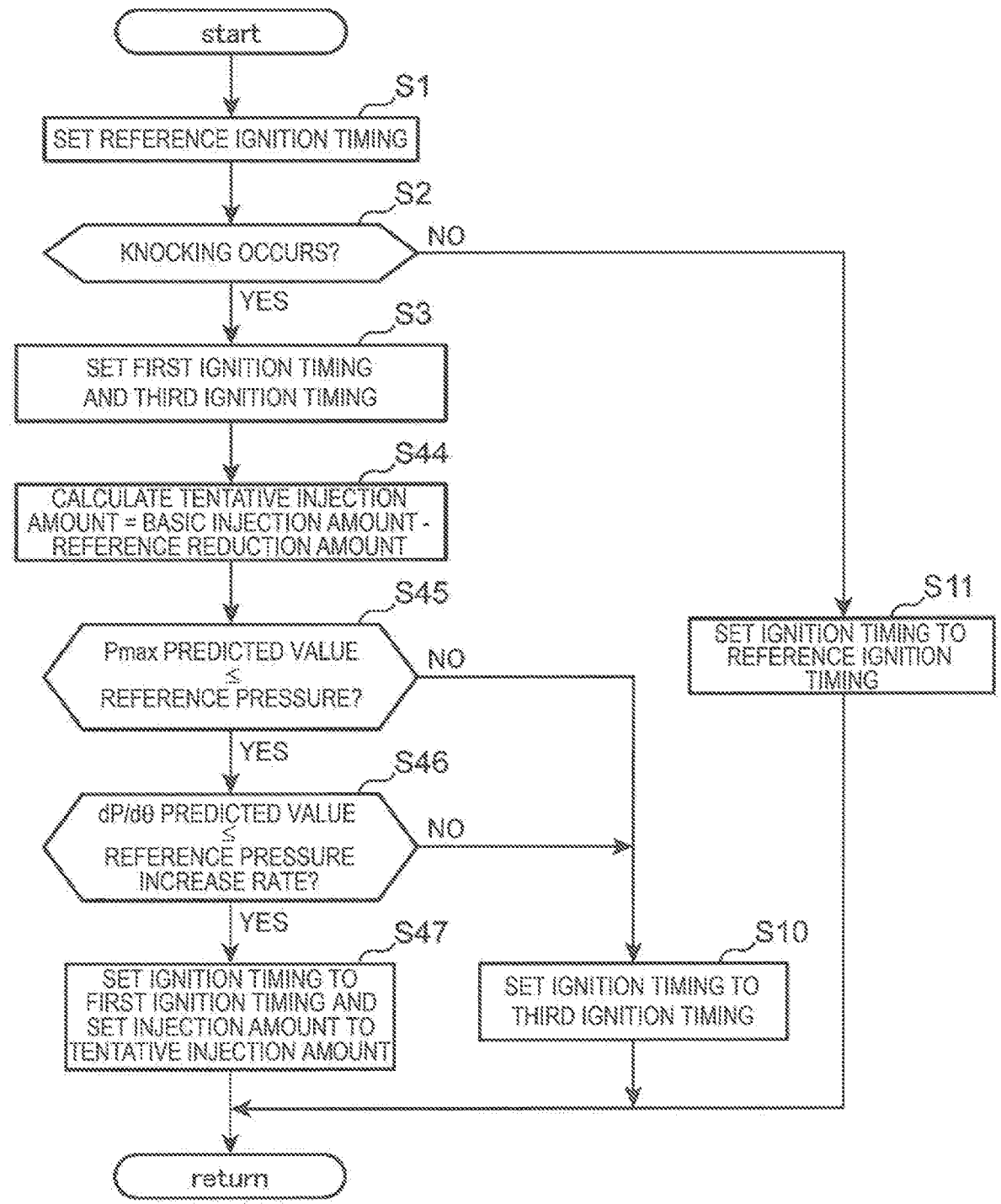
FIG. 9 is a flowchart illustrating the procedure of knock avoidance control according to a fourth embodiment.

Instead of the first to third embodiments, the control details of knock avoidance control may be configured as illustrated in FIG. 9. FIG. 9 is a flowchart illustrating the knock avoidance control according to the fourth embodiment. An engine system according to the fourth embodiment is different from the engine systems according to the first to third embodiments only in a part of the knock avoidance control and the other structure is the same among the first to third embodiments. Here, the components of the fourth embodiment that are different from those of the first to third embodiments will be described and the components identical to those of the first to third embodiment will not be described.

As described above, the region R10 in which the maximum cylinder pressure can be kept at a predetermined pressure (reference pressure) or lower and the knock strength can be kept at the allowable knock strength or lower is very narrow. Accordingly, when the ignition timing is set in this region R10, the cylinder pressure exceeds the maximum cylinder pressure relatively easily if the ignition timing deviates from a command value or the state of the combustion chamber 6 deviates from an expected state.

Figure 10:
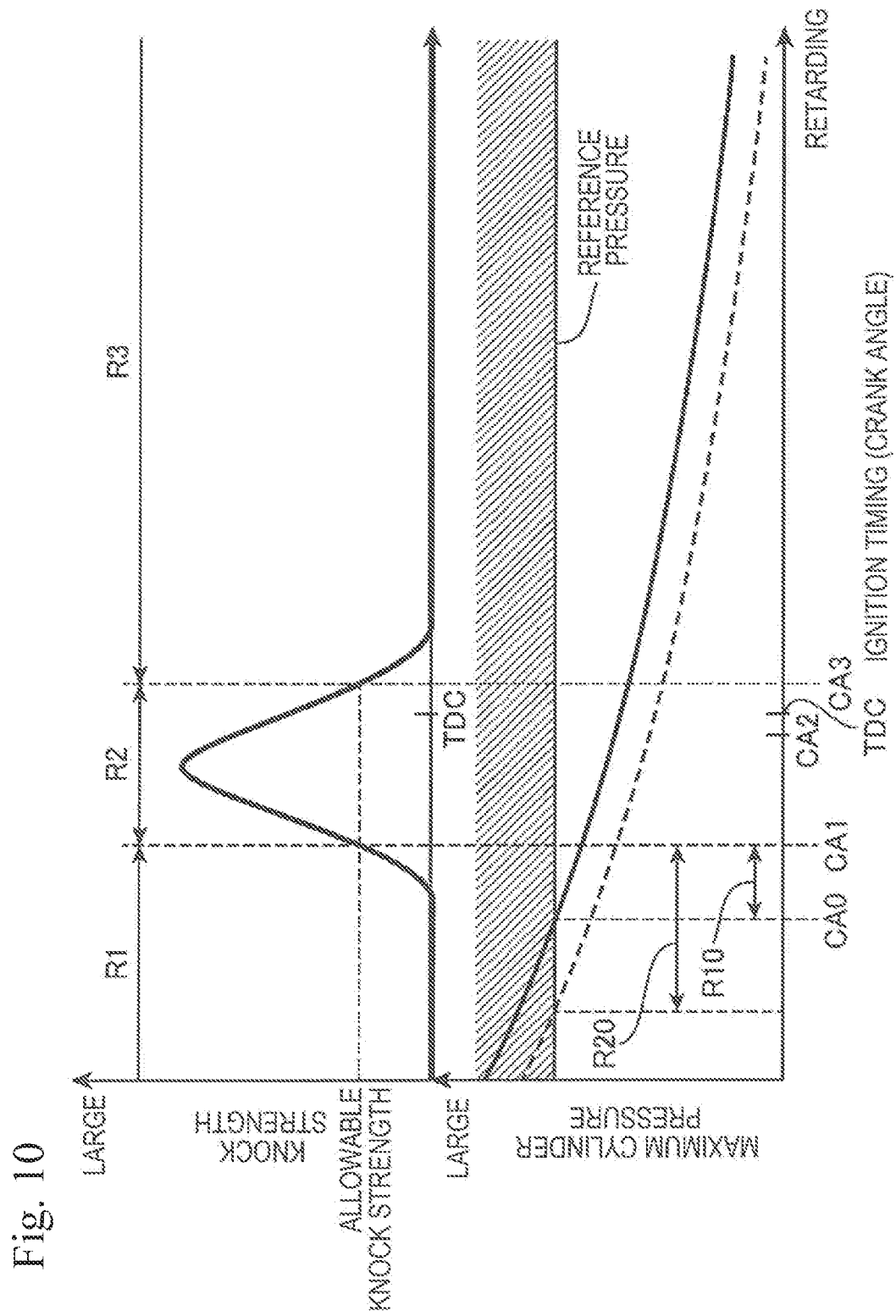
FIG. 10 is a graph illustrating the relationships between the ignition timing and the knock strength and between the ignition timing and the maximum cylinder pressure.

In contrast, if the amount of fuel supplied to the combustion chamber 6 is made smaller, the thermal energy generated in the combustion chamber 6 becomes smaller and the cylinder pressure reduces, so the maximum cylinder pressure can be reduced from the state represented by the solid line to the state represented by the dotted line, as illustrated in FIG. 10. Accordingly, if the amount of fuel supplied to the combustion chamber 6 is reduced, the maximum cylinder pressure can be suppressed to a predetermined pressure (reference pressure) or lower and the region in which the knock strength can be set to the allowable knock strength or less and the ignition timing can be set can be expanded, for example, from the region R10 to the region R20 as illustrated in FIG. 10. Accordingly, by reducing the amount of fuel supplied to combustion chamber 6, if the ignition timing deviates from a command value or the state in the combustion chamber 6 deviates from an expected state when ignition timing is set to a region on the advanced side of the knock region R2, the maximum cylinder pressure can be suppressed to the predetermined pressure or lower more surely.

Accordingly, in the fourth embodiment, if the knock strength exceeds the allowable knock strength (unacceptable knocking may occur) or unacceptable knocking actually occurs even when ignition is performed at the reference ignition timing in the high-load region A, the injection amount of the injector 14 is reduced while the ignition timing is advanced to a timing included in the advanced side region R1.

A specific flow of the knock avoidance control according to the fourth embodiment will be described with reference to the flowchart in FIG. 9. In FIG. 9, the same steps (the same steps as in the first embodiment) as in the flowchart in FIG. 6 are denoted by the same numerals as in FIG. 6. Since the control details of the steps in FIG. 9 denoted by the same reference numerals as in FIG. 6 are the same as in the first embodiment, the detailed descriptions of these steps are omitted.

Also in the fourth embodiment, the steps in the flowchart in FIG. 9 are executed when the engine operates in the high-load region A, as in the flowcharts in FIG. 6 to FIG. 8. Also in the fourth embodiment, steps S1 and S2 are first performed as in the first embodiment. That is, the PCM 100 sets the reference ignition timing in step S1 and then determines (predicts) whether knocking occurs in step S42.

When the determination in step S2 is NO and knocking is not predicted to occur even if ignition is performed at the reference ignition timing, the processing proceeds to step S11 as in the first embodiment. In step S11, the PCM 100 determines the ignition timing to be the reference ignition timing. Then, the PCM 100 causes the spark plug 13 to perform ignition at the reference ignition timing.

Also in the fourth embodiment, when the determination in step S2 is YES and knocking is predicted to occur, the processing proceeds to step S3 as in the first embodiment.

In step S3, the PCM 100 sets the first ignition timing (advanced side ignition timing) and the third ignition timing (retarded side ignition timing) as candidates for the ignition timing, as in the first embodiment.

In contrast, in the fourth embodiment, the processing proceeds to step S44 next to step S3, unlike the first embodiment. In step S44, the PCM 100 calculates the tentative injection amount that is a candidate for the injection amount of the injector 14 by subtracting a preset reference reduction amount from the basic injection amount.

As described in the second embodiment, the basic injection amount is the injection amount of the injector 14 during normal operation and is the amount of fuel corresponding to the requested engine torque. Specifically, in the fourth embodiment, the basic injection amount is the injection amount of the injector 14 during the operation excluding execution of steps S47 and S53 described later and excluding execution of knock avoidance control. Similarly, as described in the second embodiment, the reference reduction amount is, a value, sufficiently smaller than the basic injection amount, that is set to, for example, approximately 10% or less of the basic injection amount and is set and stored in advance in the PCM 100.

Next to step S44, the processing proceeds to step S45. In step S45, the PCM 100 predicts the maximum cylinder pressure Pmax when the injection amount of the injector 14 is the tentative injection amount set in step S44 and the ignition timing is the first ignition timing, and determines whether the predicted maximum cylinder pressure Pmax is equal to or less than the reference pressure.

When the determination in step S45 is YES (when the maximum cylinder pressure Pmax is predicted to be equal to or less than the reference pressure when the injection amount of the injector 14 is the tentative injection amount and the ignition timing is the first ignition timing), the processing proceeds to step S46. In step S46, the PCM 100 predicts the maximum value of $dP/d\theta$ when the injection amount of the injector 14 is the tentative injection amount set in step S4 and the ignition timing is the first ignition timing, and determines whether the predicted maximum value of $dP/d\theta$ is equal to or less than the reference pressure increase rate.

When the determination in step S46 is YES, the processing proceeds to step S47. In step S47, the PCM 100 sets the ignition timing to the first ignition timing. In addition, the PCM 100 sets the injection amount of the injector 14 to the tentative injection amount. Then, the PCM 100 causes the spark plug 13 to ignite the air-fuel mixture at the first ignition timing and the injector 14 to inject the tentative injection amount of fuel.

In contrast, when the determination in step S45 is NO or the determination in step S46 is NO, the processing proceeds to step S10 and the PCM 100 sets the ignition timing to the third ignition timing. That is, when it is predicted that the maximum cylinder pressure Pmax exceeds the reference pressure when the ignition timing is the first ignition timing and the injection amount is the tentative injection amount or the maximum value of $dP/d\theta$ in the above case exceeds the reference pressure increase rate, the PCM 100 sets the ignition timing to the third ignition timing in the step S10. Then, the PCM 100 causes the spark plug 13 to perform ignition at the third ignition timing. When the processing proceeds to step S10, the PCM 100 sets the injection amount to the basic injection amount and causes the injector 14 to inject the basic injection amount of fuel. When the process proceeds to step S11, the PCM 100 also sets the injection amount to the basic injection amount and causes the injector 14 to inject the basic injection amount of fuel.

As described above, in the fourth embodiment, when knocking is predicted to occur when ignition is performed at the reference ignition timing, as long as the maximum cylinder pressure Pmax does not exceed the reference pressure and the maximum value of $dP/d\theta$ does not exceed the reference pressure increase rate, the air-fuel mixture is ignited at this first ignition timing on the advanced side of the reference ignition timing and the injection amount of the injector 14 is set to an amount (tentative injection amount) less than the basic injection amount. In contrast, when the knocking is predicted to occur due to ignition at the reference ignition timing, if the maximum cylinder pressure Pmax becomes equal to or more than the reference pressure or the maximum value of $dP/d\theta$ becomes equal to or more than the reference pressure increase rate by setting the ignition timing to the first ignition timing even when the injection amount of the injector 14 is smaller than the basic injection amount (tentative injection amount), the air-fuel mixture is ignited at the third ignition timing on the retarded side of the reference ignition timing. Then, only when knocking is not predicted to occur due to ignition at the reference ignition timing, the air-fuel mixture is ignited at the reference ignition timing.

As described above, in the fourth embodiment, the injection amount of the injector 14 is smaller than the basic injection amount when the air-fuel mixture is ignited at the first ignition timing. Accordingly, it is possible to prevent knocking while preventing adverse effects from being exerted on the piston 5 and the like by surely suppressing the maximum cylinder pressure to the reference pressure or lower due to reduction in the injection amount and suppressing reduction in the fuel efficiency performance due to ignition at the first ignition timing.

In addition, when the maximum cylinder pressure Pmax exceeds the reference pressure or the maximum value of $dP/d\theta$ exceeds the reference pressure increase rate due to ignition at the first ignition timing even if the injection amount is reduced, the air-fuel mixture is ignited at the third ignition timing on the retarded side of the reference ignition timing. Also in the fourth embodiment, this can surely prevent adverse effects from being exerted on the piston 5 and the like and surely prevent combustion noise from exceeding a desired level.

(6) Fifth Embodiment

Figure 11:
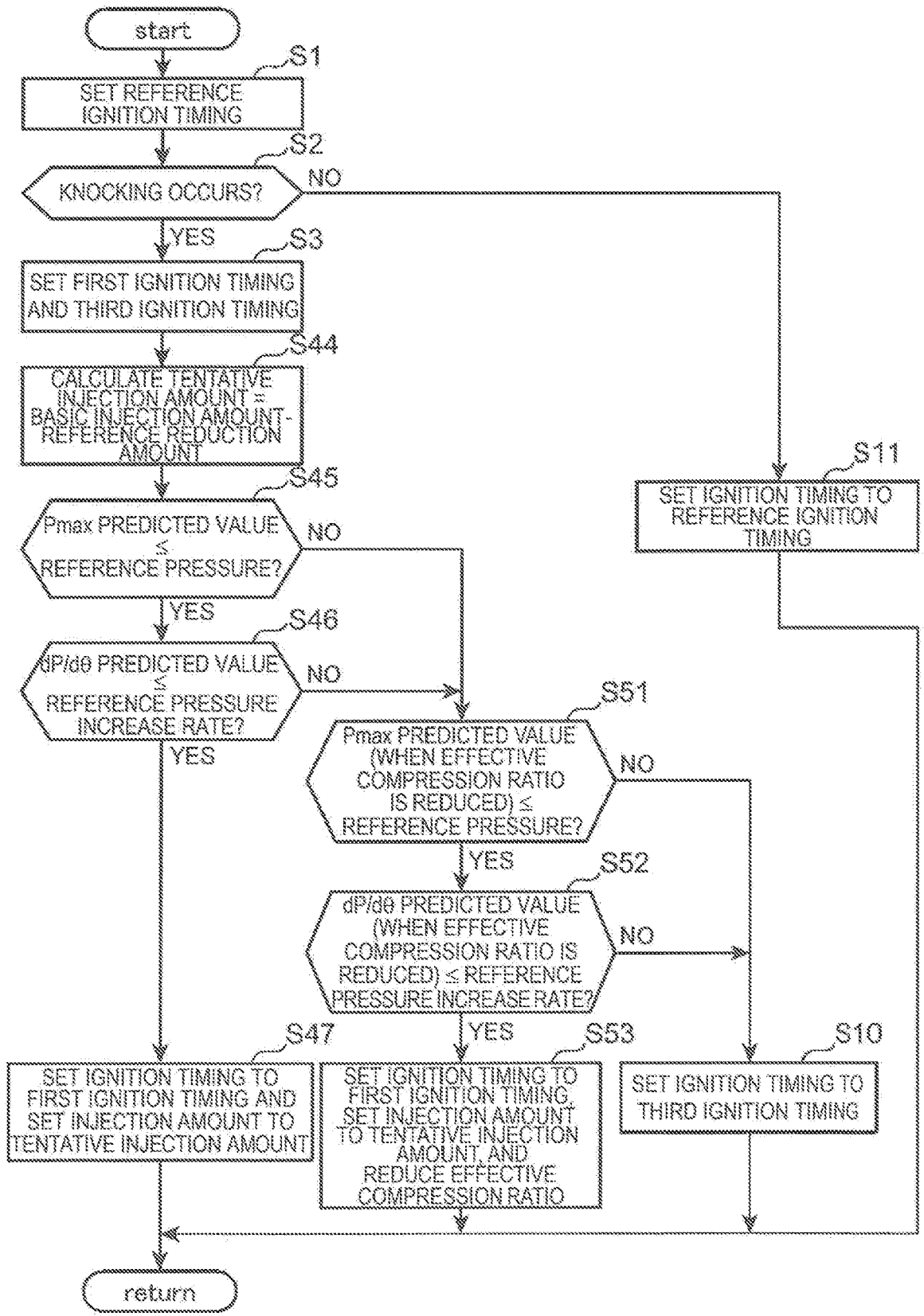
FIG. 11 is a flowchart illustrating the procedure of knock avoidance control according to a fifth embodiment.

FIG. 11 is a flowchart illustrating knock avoidance control according to a fifth embodiment. An engine system according to the fifth embodiment is different from the engine systems according to the first to fourth embodiments only in the detail of knock avoidance control and the other structure is the same as in the first to fourth embodiments. In the fifth embodiment, the control details of the steps (S51, S52, and S53) to which the processing proceeds when the determination in step S45 or step S46 is NO are different from those in the fourth embodiment. That is, between the fourth embodiment and the fifth embodiment, the control details in the case in which the maximum cylinder pressure Pmax (predicted value) when the ignition timing is the first ignition timing and the injection amount is an amount (tentative injection amount) less than the basic injection amount exceeds the reference pressure or the maximum value (predicted value) of the increase rate $dP/d\theta$ of the cylinder pressure in the above case exceeds the reference pressure increase rate are different. Since the control details (steps other than steps S51, S52, and S53) other than this are the same as in the fourth embodiment, the detailed descriptions of the steps other than steps S51, S52, and S53 are omitted here. In FIG. 11, the same steps (the same steps as in the fourth embodiment) as in the flowchart in FIG. 9 are denoted by the same numerals as in FIG. 9.

In the fifth embodiment, when the determination in step S45 or step S46 is NO (the maximum cylinder pressure Pmax (predicted value) when the injection amount of the injector 14 is the tentative injection amount and the ignition timing is the first ignition timing is determined to exceed the reference pressure or the maximum value (predicted value) of $dP/d\theta$ in the above case is determined to exceed the reference pressure increase rate), the processing proceeds to step S51.

In step S51, the PCM 100 predicts the maximum cylinder pressure Pmax when the ignition timing is the first ignition timing, the injection amount of the injector 14 is the tentative injection amount, and the effective compression ratio of the cylinder 2 is the ignition advance compression ratio (the effective compression ratio is reduced), and determines whether the predicted maximum cylinder pressure Pmax is equal to or less than the reference pressure. As described in the third embodiment, the ignition advance compression ratio is set to a value smaller than the effective compression ratio in normal times (the effective compression ratio when step S53 described later is not performed in the fifth embodiment).

When the determination in step S51 is YES and the predicted maximum cylinder pressure Pmax is equal to or less than the reference pressure, the processing proceeds to step S52. In the step S52, the PCM 100 predicts the maximum value of $dP/d\theta$ when the ignition timing is the first ignition timing, the injection amount of the injector 14 is the tentative injection amount, and the effective compression ratio of the cylinder is the ignition advance compression ratio, and determines whether the predicted maximum value of $dP/d\theta$ is equal to or less than the reference pressure increase rate.

When the determination in step S52 is YES and the predicted maximum value of $dP/d\theta$ is equal to or less than the reference pressure increase rate, the processing proceeds to step S53.

In step S53, the PCM 100 sets the ignition timing to the first ignition timing and sets the injection amount of the injector 14 to the tentative injection amount. Then, the PCM 100 causes the spark plug 13 to perform ignition at the first ignition timing and the injector 14 to inject fuel of the tentative injection amount.

In addition, the PCM 100 changes the effective compression ratio of the cylinder to the ignition advance compression ratio in step S53. As described in the third embodiment, the PCM 100 changes the closing timing of the intake valve 11 via the intake valve variable mechanism 11a so that the effective compression ratio becomes the ignition advance compression ratio.

In contrast, when the determination in step S51 is NO or the determination in step S52 is NO, the processing proceeds to step S10 and the PCM 100 sets the ignition timing to the third ignition timing. That is, when it is predicted that the maximum cylinder pressure Pmax when the effective compression ratio of the cylinder 2 is reduced exceeds the reference pressure when the ignition timing is set to the first ignition timing and the effective compression ratio of the cylinder 2 is reduced or the maximum value of $dP/d\theta$ in the above case exceeds the reference pressure increase rate, the PCM 100 sets the ignition timing to the third ignition timing in the step S10. That is, the maximum cylinder pressure Pmax when the ignition timing is the first ignition timing, the injection amount of the injector 14 is the tentative injection amount, and the effective compression ratio of cylinder 2 is the ignition advance compression ratio (the effective compression ratio is reduced) exceeds the reference pressure or the maximum value of $dP/d\theta$ in the above case exceeds the reference pressure increase rate, the PCM 100 sets the ignition timing to the third ignition timing in the step S10. Then, the PCM 100 causes the spark plug 13 to ignite the air-fuel mixture at the third ignition timing. At this time, the effective compression ratio is set to the effective compression ratio in normal times and the injection amount of the injector 14 is also set to the basic injection amount. In addition, when the processing proceeds to step S11 or step S47, the effective compression ratio is also set to the effective compression ratio in normal times. However, in step S47, the injection amount of the injector 14 is set to the tentative injection amount as in the fourth embodiment.

As described above, in the fifth embodiment, even if knocking is predicted to occur due to ignition at the reference ignition timing and it is predicted that the maximum cylinder pressure Pmax exceeds the reference pressure or the maximum value of dP/dθ exceeds the reference pressure increase rate when the ignition timing is the first ignition timing and the ignition amount of injector 14 is the tentative amount in the high-load region A, when the maximum cylinder pressure Pmax is equal to less than the reference pressure and the maximum value of dP/dθ is equal to less than the reference pressure increase rate by reducing the effective compression ratio to the ignition advance compression ratio, the effective compression ratio is reduced to the ignition advance compression ratio, the ignition timing is set to the first ignition timing, and the injection amount of the injector 14 is set to the tentative injection amount. Then, when knocking is predicted to occur due to ignition at the reference ignition timing and the maximum cylinder pressure Pmax becomes equal to or more than the reference pressure or the maximum value of dP/dθ becomes equal to or more than the reference pressure increase rate due to ignition at the first ignition timing even if the injection amount of the injector 14 is set to the tentative injection amount and the effective compression ratio is reduced to the ignition advance compression ratio, the ignition timing is set to the third ignition timing.

Accordingly, according to the fifth embodiment, it is possible to increase opportunities to perform ignition at the first ignition timing while preventing adverse effects from being exerted on the piston 5 and the like and preventing combustion noise from exceeding a desired level. This can maintain high fuel efficiency performance while suppressing knocking.

(7) Other Modifications

The geometric compression ratio of the cylinder is not limited to 15 or more. However, if the geometric compression ratio of the cylinder is 15 or more, knocking is likely to occur. Therefore, it is effective to apply the embodiments described above to an engine having a cylinder geometric compression ratio of 15 or more.

In addition, it is predicted whether knocking occurs and the ignition timing is changed when knocking is predicted to occur in the above embodiments. Instead of this, however, it may be detected whether knocking has actually occurred and, when knocking has actually occurred, the ignition timing may be changed in the combustion cycle next to the combustion cycle in which knocking has occurred. In this case, it may be determined whether knocking has occurred based on the detection value of a knock sensor or the like attached to the cylinder block or the like.

Specifically, in the flowcharts in FIG. 6 to FIG. 9 and FIG. 11, the step for determining whether knocking has occurred is performed as step S2. Specifically, it is determined whether knocking has occurred in the combustion cycle one combustion cycle before. When this determination is YES and knocking has occurred, the processing may proceed to step S3. When this determination is NO and knocking has not occurred, the processing may proceed to step S11. This can surely prevent knocking from occurring consecutively.

In addition, when, for example, the combustion state or the like of the air-fuel mixture deviates from an expected state, knocking may occur even if control for setting the ignition timing to the first ignition timing (steps S6, S23, S33, and S47) is performed. Accordingly, when knocking occurs after execution of the control for setting the ignition timing to the first ignition timing, the ignition timing may be set to the third ignition timing in the next combustion cycle. Specifically, in the flowcharts in the FIG. 6 to FIG. 9 and FIG. 11, when it is determined that knocking has occurred after step S6, S23, S33, or S47, the processing may proceed to step S10 after setting the third ignition timing, and then may set the ignition timing to the third ignition timing. This can more surely prevent knocking from occurring consecutively.

The first ignition timing only needs to be a timing on the advanced side of the MBT and the specific timing is not limited to the timing (timing on the most retarded side of the advanced side region R1) described above.

Step S5 in the flowcharts in FIG. 6, FIG. 7, and FIG. 8 and step S46 in the flowcharts in FIG. 9 and FIG. 11 may be omitted. Step S22 in the flowchart in FIG. 7, step S32 in the flowchart in FIG. 8, and step S52 in the flowchart in FIG. 11 may be omitted.

In addition, in the flowcharts in FIG. 6 to FIG. 9 and FIG. 11, a determination as to whether knocking occurs may be added between step S5 and step S6, between step S22 and step S23, between step S32 and step S33, between step S46 and step S47, and between step S52 and step S53.

Specifically, in the flowcharts in FIG. 6 to FIG. 8, when the determination in step S5 is YES, before the processing proceeds to step S6, it is predicted and determined whether knocking occurs when the ignition timing is set to the first ignition timing. Only when this determination is NO and knocking is not predicted to occur, the processing may proceed to step S6 (the ignition timing is set to the first timing). When knocking is predicted to occur even if the determination is YES and the ignition timing is set to the first ignition timing, the processing may proceed to step S10 or step S21 or S31.

Similarly, in the flowcharts in FIG. 9 and FIG. 11, when the determination in step S46 is YES, before the processing proceeds to step S47, it is predicted and determined whether knocking occurs when the injection amount of the injector 14 is set to the tentative injection amount and the ignition timing is set to the first ignition timing, and the processing may proceed to step S47 only when this determination is NO and knocking is not predicted to occur. If knocking is predicted to occur even when the determination is YES, the injection amount of the injector 14 is a tentative injection amount, and the ignition timing is set to the first ignition timing, the processing may proceed to step S10 or S51.

In the flowchart in FIG. 7, when the determination in step S22 is YES, before the processing proceeds to step S23, it is predicted and determined whether knocking occurs when the injection amount of the injector 14 is reduced by the reference reduction amount from the basic injection amount and the ignition timing is set to the first ignition timing, and the processing may proceed to step S23 only when this determination is NO and knocking is not predicted to occur. If knocking is predicted to occur even when the determination is YES, the injection amount of the injector 14 is reduced by the reference injection amount from the basic injection amount, and the ignition timing is set to the first ignition timing, the processing may proceed to step S10 and the ignition timing may be set to the third ignition timing.

In the flowchart in FIG. 8, when the determination in step S32 is YES, before the processing proceeds to step S33, it is predicted and determined whether knocking occurs when the effective compression ratio is set to the ignition advance compression ratio the ignition timing is set to the first ignition timing, and the processing may proceed to step S23 only when this determination is NO and knocking is not predicted to occur. If knocking is predicted to occur even when the determination is YES, the effective compression ratio is set to the ignition advance compression ratio, and the ignition timing is set to the first ignition timing, the processing may proceed to step S10 and the ignition timing may be set to the third ignition timing.

In the flowchart in FIG. 11, when the determination in step S52 is YES, before the processing proceeds to step S53, it is predicted and determined whether knocking occurs when the injection amount of the injector 14 is the tentative injection amount, the ignition timing is set to the first ignition timing, and the effective compression ratio is set to the advance compression ratio, and the processing may proceed to step S53 only when this determination is NO and knocking is not predicted to occur. If knocking is predicted to occur even when the determination is YES, the injection amount of the injector 14 is set to the tentative injection amount, the ignition timing is set to the first ignition timing, and the effective compression ratio is the advance compression ratio, the processing may proceed to step S10 and the ignition timing may be set to the third ignition timing.

As described above, the inventors of the present application have found the following as a result of earnest research. When the ignition timing is advanced from a predetermined ignition timing (ignition timing on the retarded side of the basic ignition timing) on the retarded side of the MBT at which knocking does not occur, knocking starts occurring. When the ignition timing is advanced from the MBT by a predetermined amount, knocking exceeding the allowable knock strength that leads to degradation in the reliability of the engine body starts occurring. When the ignition timing is further advanced, however, nocking no longer occurs or the strength of knocking is reduced to the allowable knock strength or less. Furthermore, when the ignition timing is advanced and retarded from the reference ignition timing which is the basic ignition timing, although knocking does not occur similarly in both cases, the engine torque obtained when the ignition timing is advanced is higher than the engine torque obtained when the ignition timing is retarded. In particular, in a high-expansion-ratio engine with a high compression ratio, the engine torque when the ignition timing is advanced from the reference ignition timing is higher than the engine torque when the ignition timing is retarded from the reference ignition timing.

As described above, it is considered that the above phenomenon is caused by the following reasons.

When the ignition timing is sufficiently advanced, a relatively large amount of fuel can be burned early and the amount of fuel that locally overheats at the outer periphery of the combustion chamber and then causes knocking can be reduced, thereby suppressing knocking.

When the ignition timing is advanced, since fuel burns at a timing at which the amount of change in the piston position with respect to change in the crank angle is relatively small, even if some reverse torque acts on the engine (even if some torque in the reverse rotation direction acts on the piston), an engine torque that exceeds this reverse torque can be obtained. Specifically, when the ignition timing is retarded, the combustion gravity center timing deviates significantly from the timing at which the piston is effectively pushed down and combustion progresses at a timing at which the expansion margin of the combustion chamber becomes relatively large. Accordingly, when the ignition timing is retarded, the combustion speed slows down and the engine torque drops significantly. In contrast, when the ignition timing sufficiently advanced (when the ignition timing is set to be significantly advanced from the compression top dead center), the combustion gravity center timing is close to the compression top dead center (around the compression top dead center). This ensures high combustion speed even after passing the combustion gravity center timing. As a result, even if some reverse torque acts on the engine, a higher engine torque can be obtained than when the ignition timing is retarded.

Accordingly, when the ignition timing is advanced significantly from the reference ignition timing set on the retarded side of the MBT, knocking is avoided or the strength of knocking is reduced to the allowable knock strength or less even if knocking occurs (an instantaneous increase in the cylinder pressure during knocking can be reduced). If knocking can be avoided or the strength of knocking can be reduced to the allowable knock strength, reduction in the reliability of the engine body can be prevented.

The embodiments described above are based on the findings described above. The above embodiments are summarized as follows.

The control device according to the embodiment is a control device for an engine having a cylinder in which a combustion chamber is formed, the device including fuel supply means for supplying fuel containing gasoline to the combustion chamber; ignition means for igniting an air-fuel mixture of air and the fuel supplied to the combustion chamber by the fuel supply means; and control means for controlling the ignition means, in which, if knocking occurs when ignition is performed at a reference ignition timing set on a retarded side of MBT that is an ignition timing at which an engine torque is maximized in a high-load region in which an engine load is larger than a predetermined load, the control means performs ignition advance control that causes the ignition means to perform ignition at a timing on an advanced side of the reference ignition timing.

In addition, "if knocking occurs" described above refers to the case in which the strength of knocking that leads degradation in the reliability of the engine body exceeds the allowable knock strength.

According to this structure, by causing the ignition means to perform ignition at a timing on the advanced side of the reference ignition timing set on the retarded side of the MBT in the high-load region, it is possible to obtain a high engine torque while suppressing the occurrence of knocking, that is, to obtain high fuel efficiency performance because of reasons as described above.

In the structure described above, preferably, if a maximum value of a pressure in the combustion chamber is predicted to exceed a preset reference pressure when the ignition advance control is performed, the control means controls the fuel supply means so as to reduce the fuel supplied to the combustion chamber while performing the ignition advance control.

According to this structure, the maximum cylinder pressure, which is the maximum value of the pressure in the combustion chamber, can be suppressed to a low level by reducing fuel. This can suppress knocking while ensuring high fuel efficiency performance by performing ignition advance control while reducing adverse effects on the piston and the like.

In the structure described above, preferably, the control device further includes effective compression ratio changing means capable of changing an effective compression ratio of the cylinder, in which, if the maximum value of the pressure in the combustion chamber is predicted to exceed the preset reference pressure when the ignition advance control is performed, the control means controls the effective compression ratio changing means so that the effective compression ratio of the cylinder in the high-load region is lower than in a case in which the ignition advance control is not performed while performing the ignition advance control.

According to this structure, the maximum cylinder pressure can be suppressed to a low level by reducing the effective compression ratio. This can suppress knocking while ensuring high fuel efficiency performance by performing ignition advance control while reducing adverse effects on the piston and the like.

In addition, as a structure other than the above structure, if the maximum value of the pressure in the combustion chamber is predicted to exceed a preset reference pressure when the ignition advance control is performed, the control means does not perform the ignition advance control and may cause the ignition means to perform ignition at a timing on a retarded side of the reference ignition timing.

This structure can also suppress the maximum cylinder pressure to a low level. Accordingly, adverse effects on the piston and the like can be prevented.

In the structure described above, preferably, if knocking occurs after performing the ignition advance control or if knocking is predicted to occur by performing the ignition advance control, the control means causes the ignition means to perform ignition at a retarded side ignition timing on the retarded side of the reference ignition timing.

This can more surely prevent the occurrence of knocking (consecutive occurrence of knocking).

When the geometric compression ratio of the cylinder is high, the temperature in the combustion chamber becomes high and knocking is likely to occur. In addition, when the geometric compression ratio is high, the amount of reduction in the engine torque with respect to the retarded amount of the ignition timing when the ignition timing is retarded within the range on the retarded side of the MBT becomes large. Accordingly, when the present invention is applied to an engine with a geometric compression ratio of the cylinder of 15 or more, knocking can be suppressed while effectively suppressing reduction in the engine torque.

In the structure described above, preferably, the control means reduces the fuel supplied to the combustion chamber by the fuel supply means when performing the ignition advance control.

In this structure, the fuel supplied to the combustion chamber is reduced while the ignition timing is advanced. Accordingly, adverse effects on the piston and the like can be surely reduced by advancing the ignition timing.

Specifically, when the ignition timing is advanced beyond the reference ignition timing, most of the air-fuel mixture burns at a timing closer to the compression top dead center. This increases the maximum value (referred to below as the maximum cylinder pressure as appropriate) of the pressure in the combustion chamber becomes high. When the maximum cylinder pressure exceeds a specified value, adverse effects may be exerted on the piston and the like.

In contrast, in this structure, the maximum cylinder pressure can be suppressed to a low level by reducing the fuel supplied to the combustion chamber when the ignition timing is advanced. This can surely reduce adverse effects on the piston and the like while suppressing knocking by advancing the ignition timing and improving the fuel efficiency performance.

An engine to which the embodiments described above are applied may be an engine that performs partial compression ignition combustion that burns a part of the air-fuel mixture via ignition by the ignition means and then burns another air-fuel mixture by self-ignition in at least a part of the high-load region.

The control device according to the fourth and fifth embodiments is a control device for an engine having a cylinder in which a combustion chamber is formed, the device including fuel supply means for supplying fuel to the combustion chamber; ignition means for igniting an air-fuel mixture of air and the fuel supplied to the combustion chamber by the fuel supply means; and control means for controlling the ignition means, in which a geometric compression ratio of the cylinder is set to 15 or more, and, in which, if knocking occurs when ignition is performed at a reference ignition timing set on a retarded side of MBT that is an ignition timing at which an engine torque is maximized in a high-load region in which an engine load is larger than a predetermined load, the control means performs ignition advance control that causes the ignition means to perform ignition at a timing on an advanced side of the reference ignition timing and the fuel supply means to reduce fuel supplied to the combustion chamber.

This device can suppress knocking while effectively suppressing reduction in the engine torque and can surely reduce adverse effects on the piston and the like.

The invention claimed is:

1. A control device for controlling an engine having a cylinder in which a combustion chamber is formed, the device comprising:
   a fuel injector for supplying fuel containing gasoline to the combustion chamber;
   a spark plug for igniting an air-fuel mixture of air and the fuel supplied to the combustion chamber by the fuel injector; and
   a controller for controlling the spark plug, wherein
   if knocking occurs when ignition is performed at a reference ignition timing set on a retarded side of MBT that is an ignition timing at which an engine torque is maximized in a high-load region in which an engine load is larger than a predetermined load, the controller performs ignition advance control that causes the spark plug to perform ignition at a timing on an advanced side of the reference ignition timing, and
   if a maximum value of a pressure in the combustion chamber is predicted to exceed a preset reference pressure when the ignition advance control is performed, the controller controls the fuel injector so as to reduce the fuel supplied to the combustion chamber while performing the ignition advance control.

2. The control device for an engine according to claim 1, further comprising:
   an intake valve variable mechanism capable of changing an effective compression ratio of the cylinder,
   wherein, if the maximum value of the pressure in the combustion chamber is predicted to exceed the preset reference pressure when the ignition advance control is performed, the controller controls the intake valve variable mechanism so that the effective compression ratio of the cylinder in the high-load region is lower than in a case in which the ignition advance control is not performed while performing the ignition advance control.

3. A control device for controlling an engine having a cylinder in which a combustion chamber is formed, the device comprising:
   a fuel injector for supplying fuel containing gasoline to the combustion chamber;
   a spark plug for igniting an air-fuel mixture of air and the fuel supplied to the combustion chamber by the fuel injector; and
   a controller for controlling the spark plug, wherein
   if knocking occurs when ignition is performed at a reference ignition timing set on a retarded side of MBT that is an ignition timing at which an engine torque is maximized in a high-load region in which an engine load is larger than a predetermined load, the controller performs ignition advance control that causes the spark plug to perform ignition at a timing on an advanced side of the reference ignition timing, and if the maximum value of the pressure in the combustion chamber is predicted to exceed a preset reference pressure when the ignition advance control is performed, the controller does not perform the ignition advance control and causes the spark plug to perform ignition at a timing on a retarded side of the reference ignition timing.

4. The control device for an engine according to claim 3, wherein, if knocking occurs after performing the ignition advance control or if knocking is predicted to occur by performing the ignition advance control, the controller causes the spark plug to perform ignition at a retarded side ignition timing on the retarded side of the reference ignition timing.

5. The control device for an engine according to claim 4, wherein a geometric compression ratio of the cylinder is set to 15 or more.

6. The control device for an engine according to claim 5, wherein the controller reduces the fuel supplied to the combustion chamber by the fuel injector when performing the ignition advance control.

7. The control device for an engine according to claim 6, Wherein the controller controls the spark plug and the fuel injector so as to perform partial compression ignition combustion that burns a part of the air-fuel mixture via ignition by the spark plug and then burns another air-fuel mixture with self-ignition in at least a part of the high-load region.

8. The control device for an engine according to claim 1, wherein, if knocking occurs after performing the ignition advance control or if knocking is predicted to occur by performing the ignition advance control, the controller causes the spark plug to perform ignition at a retarded side ignition timing on the retarded side of the reference ignition timing.

9. The control device for an engine according to claim 1, wherein the controller controls the spark plug and the fuel injector so as to perform partial compression ignition combustion that burns a part of the air-fuel mixture via ignition by the spark plug and then burns another air-fuel mixture with self-ignition in at least a part of the high-load region.

10. The control device for an engine according to claim 2, wherein, if knocking occurs after performing the ignition advance control or if knocking is predicted to occur by performing the ignition advance control, the controller causes the spark plug to perform ignition at a retarded side ignition timing on the retarded side of the reference ignition timing.

11. The control device for an engine according to claim 2, wherein the controller controls the spark plug and the fuel injector so as to perform partial compression ignition combustion that burns a part of the air-fuel mixture via ignition by the spark plug and then burns another air-fuel mixture with self-ignition in at least a part of the high-load region.

12. A control device for controlling an engine having a cylinder in which a combustion chamber is formed, the device comprising:
a fuel injector for supplying fuel containing gasoline to the combustion chamber;
a spark plug for igniting an air-fuel mixture of air and the fuel supplied to the combustion chamber by the fuel injector; and
a controller for controlling the spark plug, wherein
if knocking occurs when ignition is performed at a reference ignition timing set on a retarded side of MBT that is an ignition timing at which an engine torque is maximized in a high-load region in which an engine load is larger than a predetermined load, the controller performs ignition advance control that causes the spark plug to perform ignition at a timing on an advanced side of the reference ignition timing, and
if a maximum value of an increase amount of a pressure in the combustion chamber per unit crank angle is predicted to exceed a preset reference pressure increase rate when the ignition advance control is performed, the controller controls the fuel injector so as to reduce the fuel supplied to the combustion chamber while performing the ignition advance control.

\* \* \* \* \*